(12) United States Patent
Hwang

(10) Patent No.: US 11,632,841 B1
(45) Date of Patent: Apr. 18, 2023

(54) LED DRIVING DEVICE PROVIDING HIGH LED UTILIZATION AND LIGHTING APPARATUS INCLUDING THE SAME

(71) Applicant: WELLANG CO., LTD., Gyeonggi-do (KR)

(72) Inventor: Jong Tae Hwang, Seoul (KR)

(73) Assignee: WELLANG CO., LTD., Gyeonggi-do (KR)

( * ) Notice: Subject to any disclaimer, the term of this patent is extended or adjusted under 35 U.S.C. 154(b) by 0 days.

(21) Appl. No.: 17/860,656

(22) Filed: Jul. 8, 2022

(30) Foreign Application Priority Data

Nov. 2, 2021 (KR) .......................... 10-2021-0148957

(51) Int. Cl.
| | |
|---|---|
| H05B 45/14 | (2020.01) |
| H05B 45/48 | (2020.01) |
| H05B 45/397 | (2020.01) |

(52) U.S. Cl.
CPC ............ *H05B 45/48* (2020.01); *H05B 45/14* (2020.01); *H05B 45/397* (2020.01)

(58) Field of Classification Search
CPC ...... H05B 45/10; H05B 45/14; H05B 45/397; H05B 45/40; H05B 45/48; H05B 47/10
See application file for complete search history.

(56) References Cited

U.S. PATENT DOCUMENTS

| | | | |
|---|---|---|---|
| 9,107,262 B2 | 8/2015 | Jung | |
| 9,226,364 B2 | 12/2015 | Fukasawa et al. | |
| 9,420,651 B2 | 8/2016 | Hu et al. | |
| 2014/0062317 A1* | 3/2014 | Lee | H05B 45/48 315/185 R |
| 2016/0050730 A1 | 2/2016 | Kim et al. | |

FOREIGN PATENT DOCUMENTS

| | | | | |
|---|---|---|---|---|
| CN | 105282929 A | * | 1/2016 | ......... H05B 33/0812 |
| JP | 2005266397 A | | 9/2005 | |
| JP | 2006303214 A | | 11/2006 | |
| JP | 201316450 A | | 1/2013 | |
| JP | 2016154148 A | | 8/2016 | |
| KR | 102296219 B1 | | 9/2021 | |
| WO | 2012057369 A1 | | 5/2012 | |
| WO | 2016129855 A1 | | 8/2016 | |

OTHER PUBLICATIONS

Office Action issued in corresponding Korean Application No. 10-2021-0148957 dated Jan. 11, 2022, and English Translation, 12 pages.
Notice of Allowance issued in corresponding Korean Application No. 10-2021-0148957 dated Mar. 25, 2022, and English Translation, 4 pages.
"22183665.3 EP Search Report dated Sep. 2, 2022", Sep. 2, 2022, 8 pgs.
Counterpart JP Application No. 2022-109003, Notice of reasons for refusal with translation, dated Oct. 11, 2022, 12 pages.

* cited by examiner

*Primary Examiner* — Jimmy T Vu
(74) *Attorney, Agent, or Firm* — Guntin & Gust, PLC; Miyoung Shin

(57) ABSTRACT

A device may include a light-emitting diode (LED) array including a plurality of LEDs, a rectifier configured to supply an input voltage rectified from an AC voltage to the LED array, an LED driver configured to drain an LED driving current from the LED array, and a current distributor configured to sense a first current passing through at least one first LED from among the plurality of LEDs and supply a second current to at least one second LED from among the plurality of LEDs based on the first current.

13 Claims, 20 Drawing Sheets

LED DRIVING DEVICE PROVIDING HIGH LED UTILIZATION AND LIGHTING APPARATUS INCLUDING THE SAME

CROSS-REFERENCE TO RELATED APPLICATIONS

This application is based on and claims priority under 35 U.S.C. § 119 to Korean Patent Application No. 10-2021-0148957, filed on Nov. 2, 2021, in the Korean Intellectual Property Office, the disclosure of which is incorporated by reference herein in its entirety.

BACKGROUND

1. Field

One or more embodiments relate to a light emitting diode (LED), and more particularly, to a device providing high LED utilization and a lighting apparatus including the same.

2. Description of the Related Art

As an example of light-emitting devices, a light-emitting diode (LED) is used in various applications due to good power consumption and small size. The intensity of light emitted from an LED may depend on an amount of current passing therethrough, and a lighting apparatus powered by an alternating current (AC) voltage may include a component for providing an appropriate current to LEDs from the AC voltage. Therefore, it may be required to efficiently provide a current to LEDs from an AC power source. Also, a lighting apparatus may be required to stably emit light while maintaining high efficiency despite the magnitude of an AC voltage fluctuating depending on the environment.

SUMMARY

One or more embodiments include a device providing high efficiency in various environments and a lighting apparatus including the same.

Additional aspects will be set forth in part in the description which follows and, in part, will be apparent from the description, or may be learned by practice of the presented embodiments of the disclosure.

According to one or more embodiments, a device includes a light-emitting diode (LED) array including a plurality of LEDs; a rectifier configured to supply an input voltage rectified from an AC voltage to the LED array; an LED driver configured to drain an LED driving current from the LED array; and a current distributor configured to sense a first current passing through at least one first LED from among the plurality of LEDs and supply a second current to at least one second LED from among the plurality of LEDs based on the first current, wherein the first current and the second current are included in the LED driving current.

The LED driver may include a current source configured to drain the LED driving current from a first LED group including the at least one first LED and the at least one second LED; a first switch connected between the at least one first LED and the current source; and a second switch connected between the at least one second LED and the current source.

When the input voltage is equal to or greater than a first threshold value and less than a second threshold value, the first switch and the second switch may be turned on, and, when the input voltage is equal to or greater than the second threshold value and less than a third threshold value, the first switch may be turned off and the second switch may be turned on.

The device may further include a first diode including an anode connected to a first node to which the at least one first LED and the first switch are connected and a cathode connected to a second node to which the second current is output from the current distributor.

The current distributor may be configured to cut off supply of the second current when a voltage of the anode of the first diode is higher than a voltage of the cathode of the first diode.

The current distributor may be configured to supply a third current to at least one third LED from among the plurality of LEDs based on the first current, the LED driver may further include a third switch connected between the at least one third LED and the current source, and the device may further include a second diode including an anode connected to a third node to which the at least one second LED and the second switch are connected and a cathode connected to a fourth node to which the third current is output from the current distributor.

The current distributor may be configured to sense a current passing through the at least one second LED and supply the third current to at least one third LED from among the plurality of LEDs based on the current passing through the at least one second LED, the LED driver may further include a third switch connected between the at least one third LED and the current source, and the device may further include a second diode including an anode connected to a third node to which the at least one second LED and the second switch are connected and a cathode connected to a fourth node to which the third current is output from the current distributor.

The LED array may include a plurality of LED groups each including at least one LED, and, from among the plurality of LED groups, the first LED group may be the farthest apart from a node to which the input voltage is applied.

The current distributor may include a current mirror configured to generate the second current proportional to the first current.

According to one or more embodiments, a method includes supplying an input voltage rectified from an AC voltage to a light-emitting diode (LED) array including a plurality of LEDs; draining an LED driving current from the LED array; and distributing the LED driving current in a first LED group including at least one first LED and at least one second LED from among the plurality of LEDs, wherein the distributing of the LED driving current includes sensing a first current passing through the at least one first LED; and supplying a second current to the at least one second LED based on the first current.

The draining of the LED driving current may include connecting a current source to the at least one first LED and the at least one second LED when the input voltage is equal to or greater than a first threshold value and less than a second threshold value; and disconnecting the current source from the at least one first LED and connecting the current source to the at least one second LED when the input voltage is equal to or greater than the second threshold value and less than a third threshold value.

The first LED group may further include at least one third LED, and the distributing of the LED driving current may further include supplying a third current to the at least one third LED based on the first current.

The first LED group may further include at least one third LED, and the distributing of the LED driving current may further include sensing a current passing through the at least one second LED; and supplying a third current to the at least one third LED based on the current passing through the at least one second LED.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
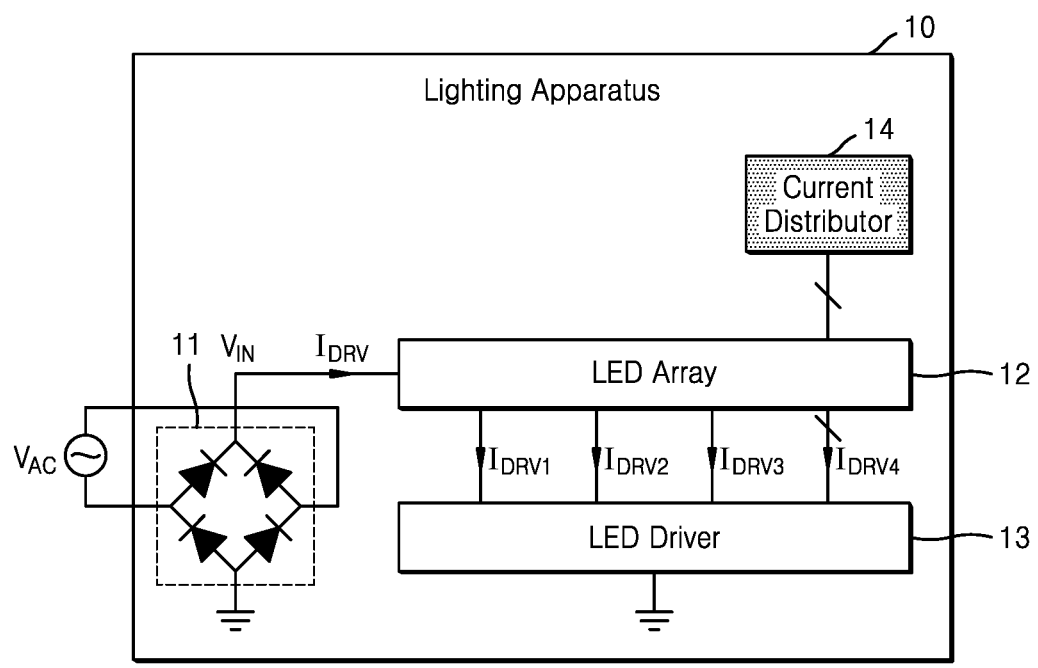
FIG. 1 is a block diagram showing a lighting apparatus according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

One or more embodiments will be described in detail with reference to the accompanying drawings. Example embodiments are provided to more fully explain one or more embodiments to one of ordinary skill in the art. One or more embodiments may include various embodiments and modifications, and embodiments thereof will be illustrated in the drawings and will be described herein in detail. However, this is not intended to limit one or more embodiments to particular modes of practice, and it is to be appreciated that all changes, equivalents, and substitutes that do not depart from the spirit and technical scope of one or more embodiments are encompassed in one or more embodiments. Like reference numerals are used for similar elements in describing each drawing. In the accompanying drawings, the dimensions of the structures are shown enlarged or reduced from the actual size for the sake of clarity of one or more embodiments.

The terms used in the present specification are merely used to describe particular embodiments, and are not intended to limit one or more embodiments. An expression used in the singular encompasses the expression of the plural, unless it has a clearly different meaning in the context. Herein, it is to be understood that the terms such as "including" or "having," etc., are intended to indicate the existence of the features, numbers, steps, actions, components, parts, or combinations thereof disclosed herein, and are not intended to preclude the possibility that one or more other features, numbers, steps, actions, components, parts, or combinations thereof may exist or may be added.

Unless otherwise defined, all terms used herein, including technical or scientific terms, have the same meaning as commonly understood by one of ordinary skill in the art to which one or more embodiments belong. Terms identical to those defined in commonly used dictionaries should be interpreted as having a meaning consistent with the meaning in the context of the related art and are not to be interpreted as ideal or overly formal in meaning unless explicitly defined in the present application.

FIG. 1 is a block diagram showing a lighting apparatus 10 according to one or more embodiments. In detail, FIG. 1 is a block diagram showing an alternating current (AC) voltage source providing power to the lighting apparatus 10 together with the lighting apparatus 10. The lighting apparatus 10 may emit light based on power provided from an AC voltage $V_{AC}$. In some embodiments, the lighting apparatus 10 may be included in a lamp for indoor lighting, outdoor lighting, portable lighting, and vehicle lighting, but one or more embodiments are not limited thereto. In some embodiments, the lighting apparatus 10 may be an independently distributed unit and have a structure removable from a lamp.

Referring to FIG. 1, the lighting apparatus 10 may include a rectifier 11, an LED array 12, an LED driver 13, and a current distributor 14. In some embodiments, two or more components included in the lighting apparatus 10 may be included in one semiconductor package. For example, the rectifier 11, the LED driver 13, and the current distributor 14 may be included in at least one semiconductor package. In some embodiments, the lighting apparatus 10 may include a printed circuit board (PCB), and at least one semiconductor package may be mounted on the PCB.

The rectifier 11 may generate an input voltage $V_{IN}$ by rectifying an AC voltage $V_{AC}$ like a sine wave. For example, the rectifier 11 may generate the input voltage $V_{IN}$ by full-wave rectifying the AC voltage $V_{AC}$ and may provide the input voltage $V_{IN}$ to the LED array 12. Herein, it is assumed that the rectifier 11 is a full-wave rectifier, but one or more embodiments are not limited thereto.

The LED array 12 may include at least one LED. For example, LED array 12 may include a single LED or at least one LED string including two or more LEDs connected in series. The LED array 12 may include a plurality of LEDs having substantially the same color temperature in some embodiments or may include a plurality of LEDs each having two or more different color temperatures in some other embodiments. LED groups included in the LED array 12 may each receive an LED driving current $I_{DRV}$ and may emit light with an intensity determined according to the magnitude of a current passing therethrough.

The LED driver 13 may drain the LED driving current $I_{DRV}$ from the LED array 12. For example, as shown in FIG. 1, the LED driver 13 may drain first to fourth LED driving currents $I_{DRV1}$ to $I_{DRV4}$ from the LED array 12. As described later with reference to the drawings, the LED driver 13 may drain one of the first to fourth LED driving currents $I_{DRV1}$ to $I_{DRV4}$ from the LED array 12 according to the level of the input voltage $V_{IN}$. Therefore, the LED driving current $I_{DRV}$ may correspond to zero or one of the first to fourth LED driving currents $I_{DRV1}$ to $I_{DRV4}$.

The current distributor 14 may distribute the LED driving current $I_{DRV}$ to LEDs included in the LED array 12. For example, the current distributor 14 may distribute a fourth LED driving current $I_{DRV4}$ to LEDs included in an LED group (e.g., G4 of FIG. 4) in which the fourth LED driving current $I_{DRV4}$ is drained by the LED driver 13 from among LED groups included in the LED array 12. To this end, as shown in FIG. 1, unlike first to third LED driving currents $I_{DRV1}$ to $I_{DRV3}$ each drained from the LED array 12 through one node, the fourth LED driving current $I_{DRV4}$ may be drained from the LED array 12 through a plurality of nodes, and a current drained through each of the plurality of nodes may be determined by the current distributor 14. As described later with reference to FIGS. 4 and 5, the current distributor 14 may distribute the fourth LED driving current $I_{DRV4}$, such that all LEDs included in a LED group emit light. Therefore, even when the peak of the AC voltage $V_{AC}$ fluctuates, all LEDs of the LED array 12 may be used to emit light, and thus the light efficiency of the lighting apparatus 10 may be increased.

In some embodiments, the current distributor 14 may be implemented independently of the LED driver 13. For example, the LED driver 13 may be included in a semiconductor package, and the current distributor 14 may be implemented as a separate semiconductor package or two or more semiconductor packages and mounted on the PCB together with the semiconductor package of the LED driver 13. Therefore, the current distributor 14 may be easily added to or removed from the lighting apparatus 10 including the LED array 12 and the LED driver 13, and the current distributor 14 may be selectively included according to various requirements of the lighting apparatus 10 (e.g., power efficiency, cost, volume, etc.). As a result, the production of various types of lighting apparatuses may be facilitated.

Figure 2:
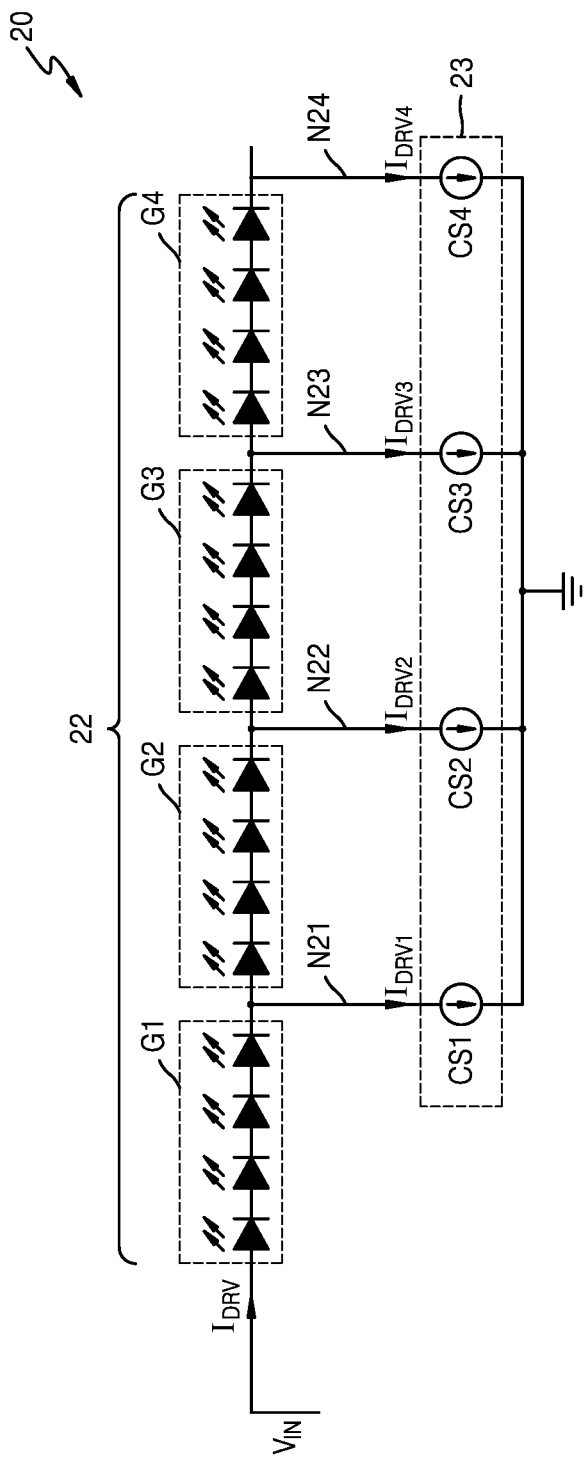
FIG. 2 is a circuit diagram showing a lighting apparatus according to one or more embodiments.
Figure 3:
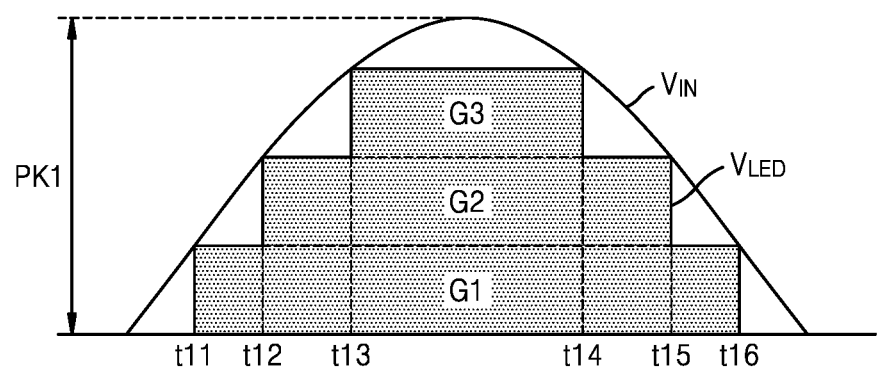
FIG. 3 is a timing diagram showing an example of the operation of a lighting apparatus according to one or more embodiments.

FIG. 2 is a circuit diagram showing a lighting apparatus 20 according to one or more embodiments, and FIG. 3 is a timing diagram showing examples of the operation of the lighting apparatus 20 according to one or more embodiments. In detail, the circuit diagram of FIG. 2 shows the lighting apparatus 20 in which the current distributor 14 of FIG. 1 is omitted.

Referring to FIG. 2, the lighting apparatus 20 may include an LED array 22 and an LED driver 23, and as described above with reference to FIG. 1, may further include a rectifier (not shown). The LED array 22 may receive an input voltage $V_{IN}$ and may include first to fourth LED groups G1 to G4 connected to one another in series. The LED driver 23 may be connected to the LED array 22 through four nodes N21 to N24 respectively corresponding to the first to fourth LED groups G1 to G4 and may drain the LED driving current $I_{DRV}$. To this end, the LED driver 23 may include first to fourth current sources CS1 to CS4 respectively connected to the four nodes N21 to N24, and the first to fourth current sources CS1 to CS4 may generate the first to fourth LED driving currents $I_{DRV1}$ to $I_{DRV4}$ in an enabled state, respectively. In some embodiments, the first to fourth LED driving currents $I_{DRV1}$ to $I_{DRV4}$ may sequentially increase or have the same magnitude ($I_{DRV1} \le I_{DRV2} \le I_{DRV3} \le I_{DRV4}$).

The first to fourth current sources CS1 to CS4 may be mutually exclusively enabled according to voltages of the four nodes N21 to N24. For example, as the input voltage $V_{IN}$ increases, the first to fourth current sources CS1 to CS4 may be sequentially enabled, and, when another current source is enabled, a previously enabled current source may be disabled. In some embodiments, the LED driver 23 may include a control circuit for controlling the first to fourth current sources CS1 to CS4 as described above.

Hereinafter, an LED array including four LED groups and an LED driver including four current sources will be mainly described, but one or more embodiments are not limited thereto. For example, the LED array 22 may include a number of LED groups different from that shown in FIG. 2, and the LED driver 23 may include a number of current sources different from that shown in FIG. 2. Also, in some embodiments, an LED group may include a number of LEDs, which are connected to one another in series, different from that shown in FIG. 2. One LED shown in the drawings herein may correspond not only to one LED, but also to two or more LEDs connected to each other in series or parallel.

Referring to FIG. 3, the input voltage $V_{IN}$ having a first peak PK1 may be provided to the LED array 22. The magnitude (e.g., peak) of the AC voltage $V_{AC}$ supplied to the lighting apparatus 20 may fluctuate due to various factors, and thus the magnitude of the input voltage $V_{IN}$ supplied to the LED array 22 is also may fluctuate. In a period from a time point t11 to a time point t12 and a time period from a time point t15 to a time point t16, the input voltage $V_{IN}$ may be higher than a LED voltage $V_{LED}$ applied to a first LED group G1, and only a first current source CS1 may be enabled. Therefore, the LED driving current $I_{DRV}$ may be equal to a first LED driving current $I_{DRV1}$, and, as shown in FIG. 3, the first LED group G1 may emit light. In a period from the time point t12 to a time point t13 and a time period from a time point t14 to the time point t15, the input voltage $V_{IN}$ may be higher than the LED voltage $V_{LED}$ applied to the first LED group G1 and a second LED group G2, and only a second current source CS2 may be enabled. Therefore, the LED driving current $I_{DRV}$ may be equal to a second LED driving current $I_{DRV2}$, and, as shown in FIG. 3, the first LED group G1 and the second LED group G2 may emit light. In a period from the time point t13 to the time point t14, the input voltage $V_{IN}$ may be higher than the LED voltage $V_{LED}$ applied to first to third LED groups G1 to G3, and only a third current source C3 may be enabled. The LED driving current $I_{DRV}$ may be equal to a third LED driving current $I_{DRV3}$, and thus, as shown in FIG. 3, the first to third LED groups G1 to G3 may emit light.

As shown in FIG. 3, when the input voltage $V_{IN}$ does not rise to the LED voltage $V_{LED}$ applied to the first to fourth LED groups G1 to G4, LEDs included in a fourth LED group G4 may not emit light. Therefore, only some of LEDs included in the LED array 22 may emit light, and the intensity of light emitted from the lighting apparatus 20 and LED utilization may decrease. As a result, the light efficiency of the lighting apparatus 20 may be deteriorated. Hereinafter, as described below with reference to FIGS. 4 and 5, the current distributor 14 of FIG. 1 may distribute the LED driving current $I_{DRV}$ to LEDs included in the fourth LED group G4 in periods included in the period from the time point t13 to the time point t14, and thus all of LEDs included in the LED array 22 may be used to emit light.

Figure 4:
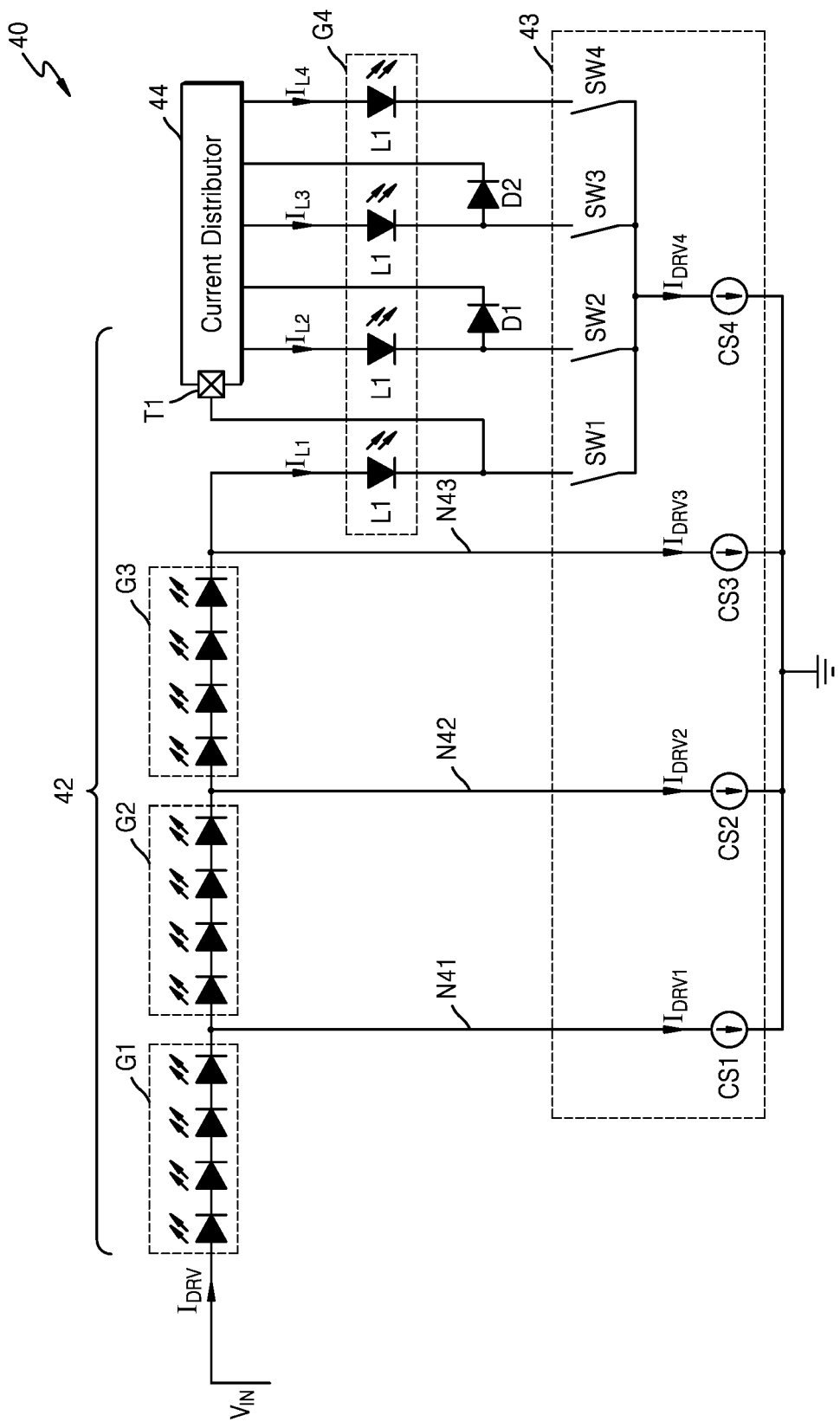
FIG. 4 is a circuit diagram showing a lighting apparatus according to one or more embodiments.
Figure 5:
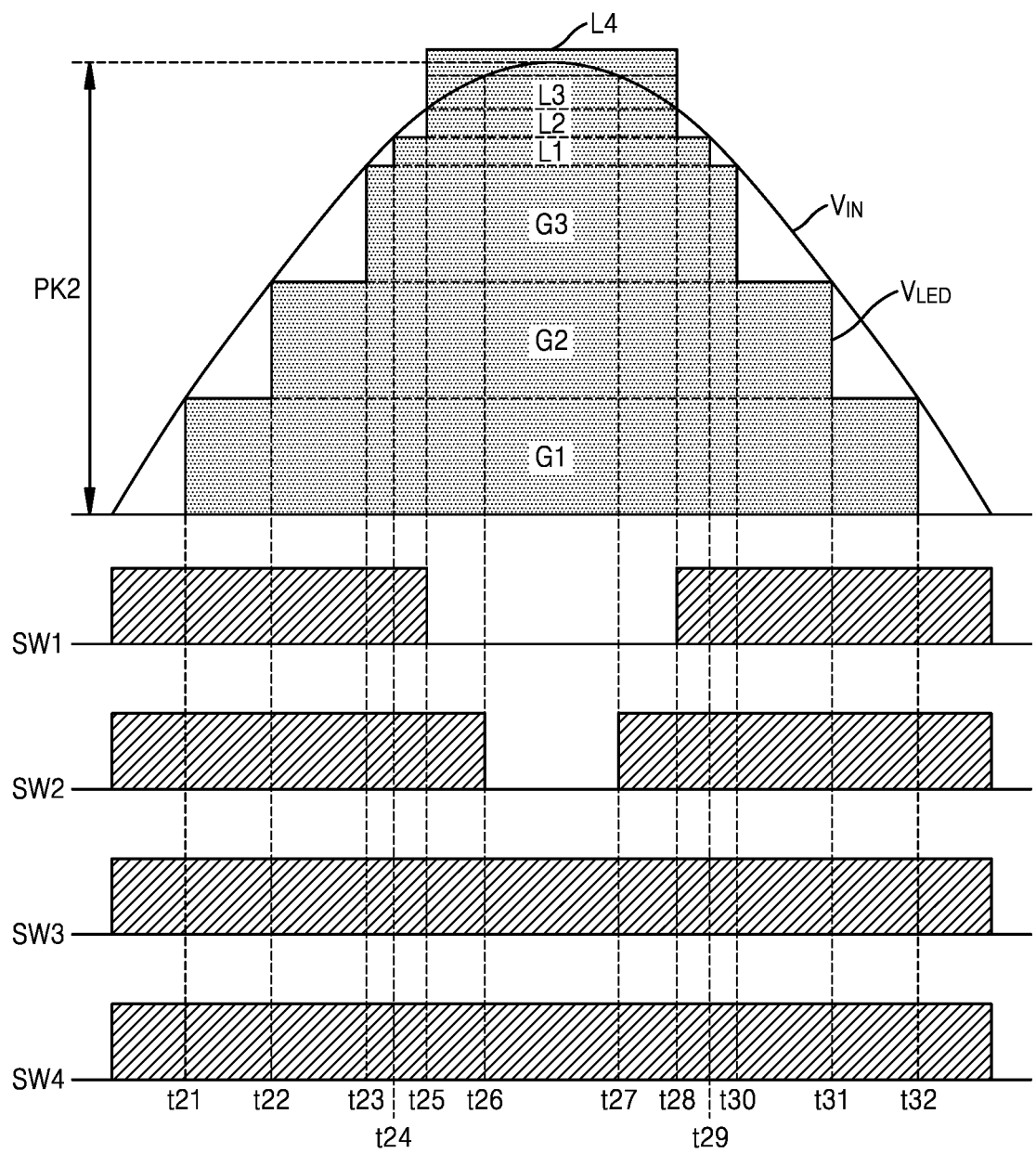
FIG. 5 is a timing diagram showing an example of the operation of a lighting apparatus according to one or more embodiments.

FIG. 4 is a circuit diagram showing a lighting apparatus 40 according to one or more embodiments, and FIG. 5 is a timing diagram showing an example of the operation of the lighting apparatus 40 according to one or more embodiments. In detail, the circuit diagram of FIG. 4 shows the lighting apparatus 40 including a current distributor 44. Hereinafter, descriptions of FIGS. 4 and 5 equal to the descriptions given above with reference to FIGS. 2 and 3 will be omitted.

Referring to FIG. 4, the lighting apparatus 40 may include an LED array 42, an LED driver 43, the current distributor 44, a first diode D1, and a second diode D2, and, as described above with reference to FIG. 1, may further include a rectifier (not shown). The LED array 42 may receive the input voltage $V_{IN}$ and may include the first to fourth LED groups G1 to G4. The LED driver 43 may include first to third current sources CS1 to CS3 respectively connected to three nodes N41 to N43 respectively corresponding to the first to third LED groups G1 to G3 and may include a fourth current source CS4 connected to the fourth LED group G4 through a plurality of nodes. The first to fourth current sources CS1 to CS4 may generate the first to fourth LED driving currents $I_{DRV1}$ to $I_{DRV4}$ in an enabled state, respectively. In some embodiments, the first to fourth LED driving currents $I_{DRV1}$ to $I_{DRV4}$ may sequentially increase or have the same magnitude ($I_{DRV1} \leq I_{DRV2} \leq I_{DRV3} \leq I_{DRV4}$).

The LED driver 43 may include first to fourth switches SW1 to SW4 respectively corresponding to first to fourth LEDs L1 to L4 included in the fourth LED group G4. As shown in FIG. 4, the first to fourth switches SW1 to SW4 may pass first to fourth currents $IL_1$ to $I_{L4}$ therethrough in the on-state, respectively. As described later with reference to FIG. 5, the first to fourth switches SW1 to SW4 may be sequentially turned on or off according to the magnitude of the input voltage $V_{IN}$, similarly as the first to fourth current sources CS1 to CS4.

The current distributor 44 may be connected to LEDs included in the fourth LED group G4. For example, as shown in FIG. 4, the current distributor 44 may be connected to the first to fourth LEDs L1 to L4. The current distributor 44 may sense a second LED current $I_{L2}$ passing through a second LED L2, and, based on the sensed second LED current $I_{L2}$, and may supply a third LED current $I_{L3}$ and a fourth LED current $I_{L4}$ to a third LED L3 and a fourth LED L4, respectively. Therefore, even when the input voltage $V_{IN}$ does not rise to the LED voltage $V_{LED}$ applied to the third LED L3 and the fourth LED L4 of the fourth LED group G4, the third LED L3 and the fourth LED L4 may emit light.

In some embodiments, unlike that shown in FIG. 4, a first terminal T1 of the current distributor 44 may be connected to a third LED group G3, and the current distributor 44 may supply a first LED current $I_{L1}$ to a first LED L1. In this case, the current distributor 44 may sense the first LED current $I_{L1}$ and supply second to fourth LED currents $I_{L2}$ to $I_{L4}$ based on the first LED current $I_{L1}$ Also, in some embodiments, unlike that shown in FIG. 4, the first terminal T1 of the current distributor 44 may be connected to the second LED L2. In this case, the current distributor 44 may sense the third LED current $I_{L3}$ and supply the fourth LED current $I_{L4}$ based on the third LED current $I_{L3}$.

Referring to FIG. 5, the input voltage $V_{IN}$ having a second peak PK2 may be provided to the LED array 42. As shown in FIG. 5, the input voltage $V_{IN}$ may be greater than the LED voltage $V_{LED}$ applied to the first to third LED groups G1 to G3 and first to third LEDs L1 to L3 of the fourth LED group G4, but the input voltage $V_{IN}$ may not rise to the LED voltage $V_{LED}$ applied to the fourth LED L4. Nevertheless, the fourth LED L4 may emit light together with the second LED L2 and the third LED L3.

In a period from a time point t21 to a time point t22 and a time period from a time point t31 to a time point t32, the input voltage $V_{IN}$ may be higher than a LED voltage $V_{LED}$ applied to the first LED group G1, and only the first current source CS1 may be enabled. Therefore, the LED driving current $I_{DRV}$ may be equal to the first LED driving current $I_{DRV1}$, and, as shown in FIG. 3, the first LED group G1 may emit light. In a period from the time point t22 to a time point t23 and a time period from a time point t30 to the time point t31, the input voltage $V_{IN}$ may be higher than the LED voltage $V_{LED}$ applied to the first LED group G1 and the second LED group G2, and only the second current source CS2 may be enabled. Therefore, the LED driving current $I_{DRV}$ may be equal to the second LED driving current $I_{DRV2}$, and, as shown in FIG. 3, the first LED group G1 and the second LED group G2 may emit light. In a period from the time point t23 to a time point t24 and a time period from a time point t29 to a time point t30, the input voltage $V_{IN}$ may be higher than the LED voltage $V_{LED}$ applied to the first to third LED groups G1 to G3, and only the third current source C3 may be enabled. The LED driving current $I_{DRV}$ may be equal to the third LED driving current $I_{DRV3}$, and thus, as shown in FIG. 3, the first to third LED groups G1 to G3 may emit light.

In a period from the time point t24 to a time point t25 and a period from a time point t28 to the time point t29, the input voltage $V_{IN}$ may be higher than the LED voltage $V_{LED}$ applied to the first to third LED groups G1 to G3 and first LEDs L1 of the fourth LED group G4, and only a fourth current source C4 may be enabled. As shown in FIG. 5, due to a turned-on first switch SW1, the LED driving current $I_{DRV}$ equal to a fourth LED driving current $I_{DRV4}$ may pass through the first LED L1 and the first switch SW1, and the first LED current $I_{L1}$ of FIG. 4 may be equal to the fourth LED driving current $I_{DRV4}$.

In a period from the time point t25 to a time point t26 and a period from a time point t27 to the time point t28, the input voltage $V_{IN}$ may be higher than the LED voltage $V_{LED}$ applied to the first to third LED groups G1 to G3 and first LEDs L1 and second LEDs L2 of the fourth LED group G4, and only a fourth current source C4 may be enabled. As shown in FIG. 5, the first switch SW1 may be turned off, and second to fourth switches SW2 to SW4 may maintain a turned-on state. Therefore, the LED driving current $I_{DRV}$ corresponding to the fourth LED driving current $I_{DRV4}$ may pass through the first LED L1 and may flow while being dispersed in second to fourth LEDs L2 to L4. In other words, the fourth LED driving current $I_{DRV4}$ may be equal to the first LED current $I_{L1}$ and may be equal to the sum of the second to fourth LED currents $I_{L2}$ to $I_{L4}$. Therefore, second to fourth LED currents $I_{L2}$ to $I_{L4}$ may flow in the second to fourth LEDs L2 to L4, respectively, and the second to fourth LEDs L2 to L4 may emit light.

In a period from the time point t26 to the time point t27, the input voltage $V_{IN}$ may be higher than the LED voltage $V_{LED}$ applied to the first to third LED groups G1 to G3 and the first to third LEDs L1 to L3 of the fourth LED group G4, and only the fourth current source C4 may be enabled. As shown in FIG. 5, the first switch SW1 and a second switch SW2 may be turned off, and a third switch SW3 and a fourth switch SW4 may maintain a turn-on state. Therefore, the LED driving current $I_{DRV}$ equal to the fourth LED driving current $I_{DRV4}$ may sequentially pass through the first LED L1 and the second LED L2 and may flow while being dispersed in the third LED L3 and the fourth LED L4. In other words, the fourth LED driving current $I_{DRV4}$ may be equal to each of the first LED current $I_{L1}$ and the second LED current $I_{L2}$ and may be equal to the sum of the third LED current $I_{L3}$ and the fourth LED current $I_{L4}$. Therefore, the third LED current $I_{L3}$ and the fourth LED current $I_{L4}$ may flow in the third LED L3 and the fourth LED L4, respectively, and the third LED L3 and the fourth LED L4 may emit light. Hereinafter, examples of the current distributor 44 for distributing current to the second to fourth LEDs L2 to L4 as shown in FIG. 5 will be described with reference to the drawings. However, one or more embodiments are not limited thereto, and the magnitudes of distributed currents may be variously combined by, for example, circuits described later with reference to FIGS. 10A to 10E.

Figure 6:
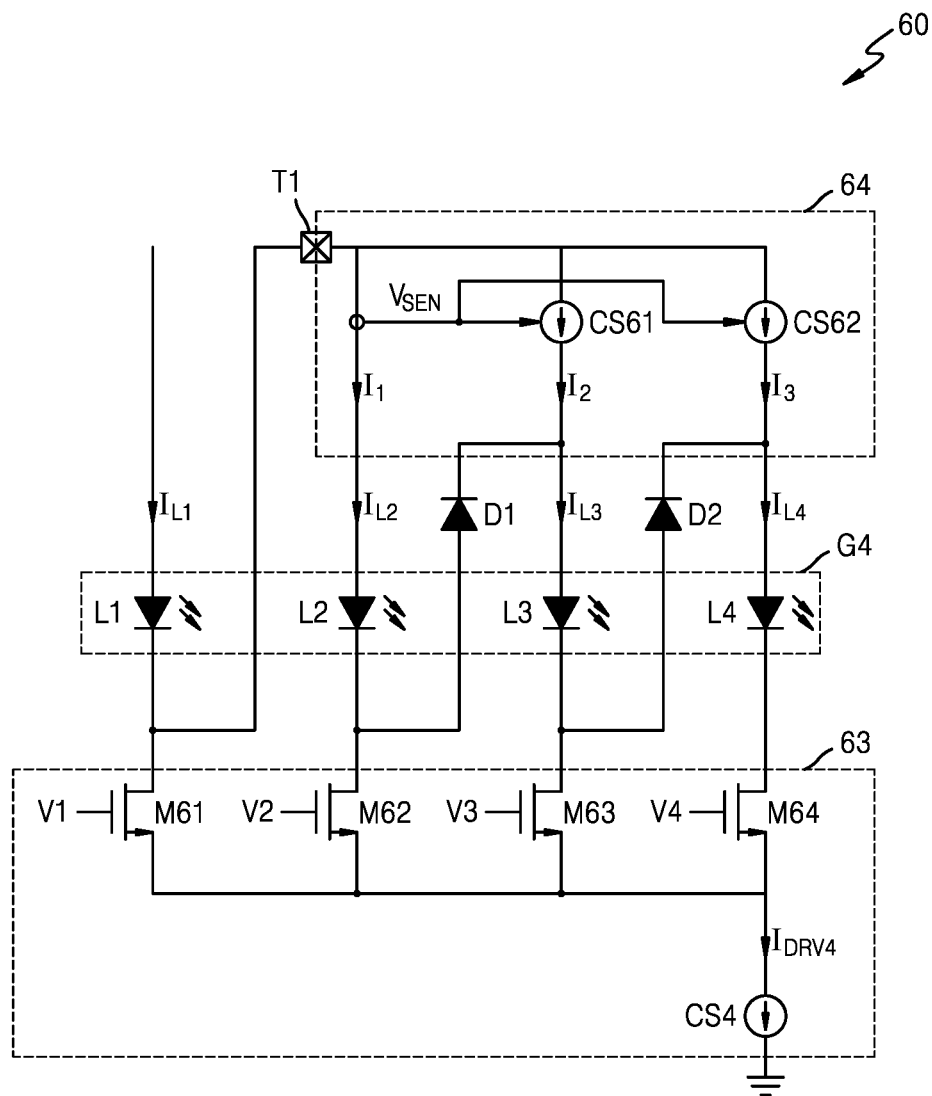
FIG. 6 is a circuit diagram showing a lighting apparatus according to one or more embodiments.
Figure 7:
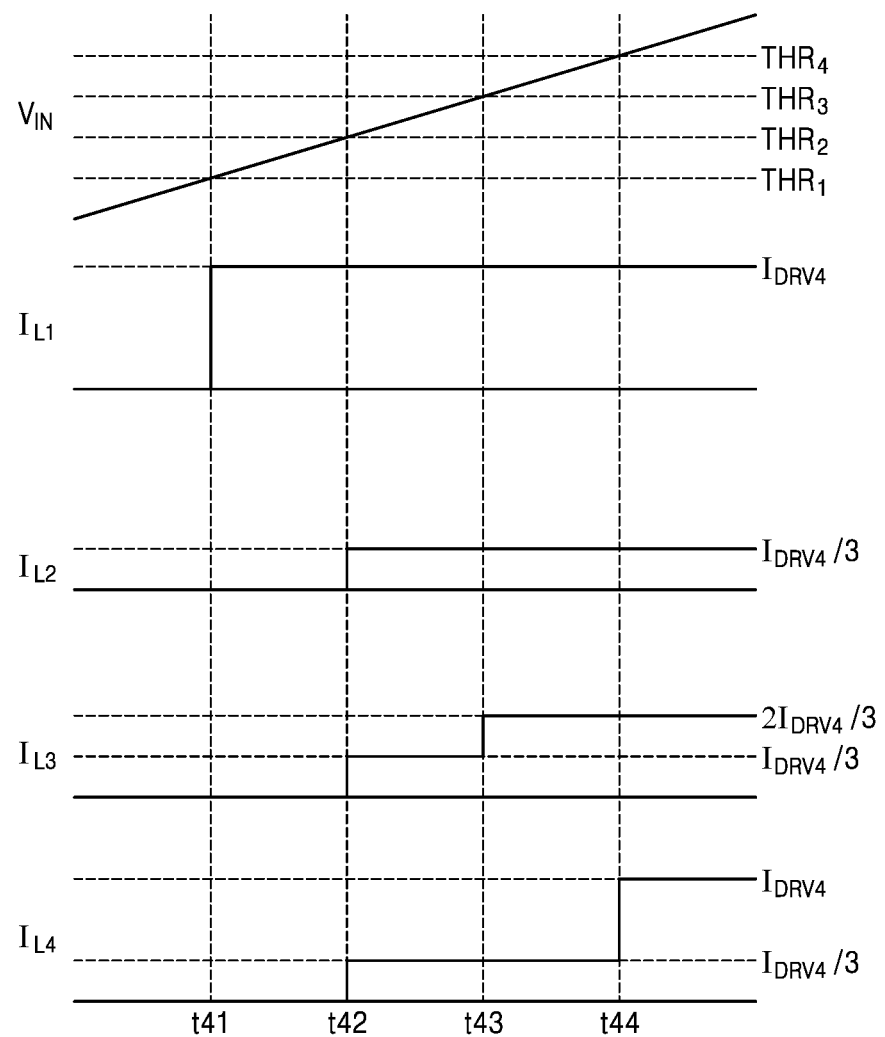
FIG. 7 is a timing diagram showing the operation of a lighting apparatus according to one or more embodiments.

FIG. 6 is a circuit diagram showing a lighting apparatus 60 according to one or more embodiments, and FIG. 7 is a timing diagram showing the operation of the lighting apparatus 60 according to one or more embodiments.

Referring to FIG. 6, the lighting apparatus 60 may include an LED driver 63, a current distributor 64, the fourth LED group G4, the first diode D1, and the second diode D2. The fourth LED group G4 may include the first to fourth LEDs L1 to L4.

The LED driver 63 may include the fourth current source CS4 and first to fourth transistors M61 to M64. The fourth current source CS4 may correspond to the fourth current source CS4 of FIG. 4, and the first to fourth transistors M61 to M64 may correspond to the first to fourth switches SW1 to SW4 of FIG. 4, respectively. As shown in FIG. 6, first to fourth voltages V1 to V4 may be applied to gates of the first to fourth transistors M61 to M64, respectively. The first to fourth voltages V1 to V4 may have sequentially increasing magnitudes (V1<<V2<V3<V4), such that the first to fourth transistors M61 to M64 operate as described above with reference to FIG. 5. As described above with reference to FIG. 4, the LED driver 63 may further include additional current sources. The LED driver 63 shown in FIG. 6 is merely an example, and, in some embodiments, the LED driver 63 may have a structure different from that shown in FIG. 6 (e.g., 83 of FIG. 8).

The current distributor 64 may include the first terminal T1, a first current source CS61, and a second current source CS62. The first current source CS61 and the second current source CS62 may be current controlled current sources. For example, as shown in FIG. 6, a sensing voltage $V_{SEN}$ may be generated by sensing the second LED current $I_{L2}$ passing through the second LED L2, that is, a first current $I_1$, and the first current source CS61 and the second current source CS62 may supply a second current $I_2$ and a third current $I_3$ corresponding to the magnitude of the sensing voltage $V_{SEN}$. Hereinafter, it is assumed that the first current source CS61 and the second current source CS62 respectively supply the second current $I_2$ and the third current $I_3$ having the same magnitude as the first current $I_1$, but one or more embodiments are not limited thereto.

Referring to FIG. 7, the input voltage $V_{IN}$ may gradually increase. At a time point t41, the input voltage $V_{IN}$ may cross a first threshold value $THR_1$. In some embodiments, the first threshold value $THR_1$ may correspond to the LED voltage of the first to third LED groups G1 to G3 and the LED voltage of the first LED L1 of the fourth LED group G4. Although the first to fourth transistors M61 to M64 are in the turned-on state, only the first LED L1 may be turned on due to the magnitude of the input voltage $V_{IN}$, and thus the first LED current $I_{L1}$ equal to the fourth LED driving current $I_{DRV4}$ may pass through the first LED L1.

At a time point t42, the input voltage $V_{IN}$ may cross a second threshold value $THR_2$. In some embodiments, the second threshold value $THR_2$ may correspond to the LED voltage of the first to third LED groups G1 to G3 and the LED voltage of the first LED L1 and the second LED L2 of the fourth LED group G4. A first transistor M61 may be turned off, and second to fourth transistors M62 to M64 may maintain a turned-on state. The first LED current $I_{L1}$ equal to the fourth LED driving current $I_{DRV4}$ may flow into the current distributor 64 through the first terminal T1, and the sum of the second to fourth LED currents $I_{L2}$ to $IL_4$ may be equal to the first LED current $I_{L1}$ The first current source CS61 and the second current source CS62 may supply the second current $I_2$ and the third current $I_3$ having the same magnitude as the first current $I_1$, respectively, and thus the second to fourth LED currents $I_{L2}$ to $I_{L4}$ may each correspond to ⅓ of the fourth LED driving current $I_{DRV4}$.

At a time point t43, the input voltage $V_{IN}$ may cross a third threshold value $THR_3$. In some embodiments, the third threshold value $THR_3$ may correspond to the LED voltage of the first to third LED groups G1 to G3 and the LED voltage of the first to third LEDs L1 to L3 of the fourth LED group G4. The first transistor M61 and a second transistor M62 may be turned off, and a third transistor M63 and a fourth transistor M64 may maintain a turned-on state. The third LED current $I_{L3}$ may correspond to the sum of the second LED current $I_{L2}$ (i.e., the first current and the second current $I_2$ supplied by the first current source CS61, and thus the third LED current $I_{L3}$ may correspond to ⅔ of the fourth LED driving current $I_{DRV4}$.

At a time point t44, the input voltage $V_{IN}$ may cross a fourth threshold value $THR_4$. In some embodiments, the fourth threshold value $THR_4$ may correspond to the LED voltage of the first to third LED groups G1 to G3 and the LED voltage of the first to fourth LEDs L1 to L4 of the fourth LED group G4. First to third transistors M61 to M63 may be turned off, and the fourth transistor M64 may be turned on. The fourth LED current $I_{L4}$ may correspond to the sum of the third LED current $I_{L3}$ and the third current $I_3$ supplied by the second current source CS62, and thus the fourth LED current $I_{L4}$ may correspond to the magnitude of the fourth LED driving current $I_{DRV4}$. As a result, currents may flow in all of the first to fourth LEDs L1 to L4 after the time point t41, and thus the first to fourth LEDs L1 to L4 may emit light.

Figure 8:
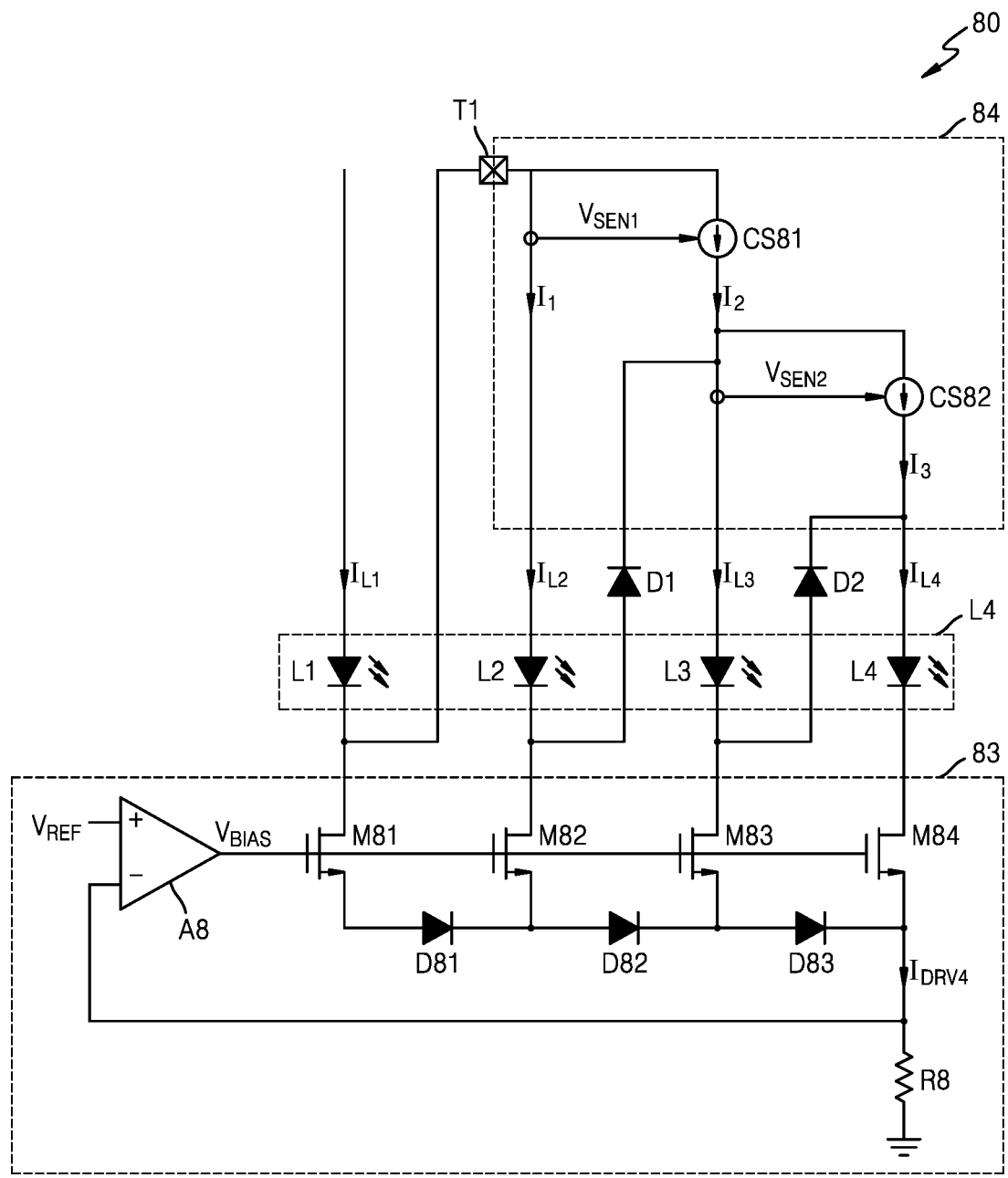
FIG. 8 is a circuit diagram showing a lighting apparatus according to one or more embodiments.
Figure 9:
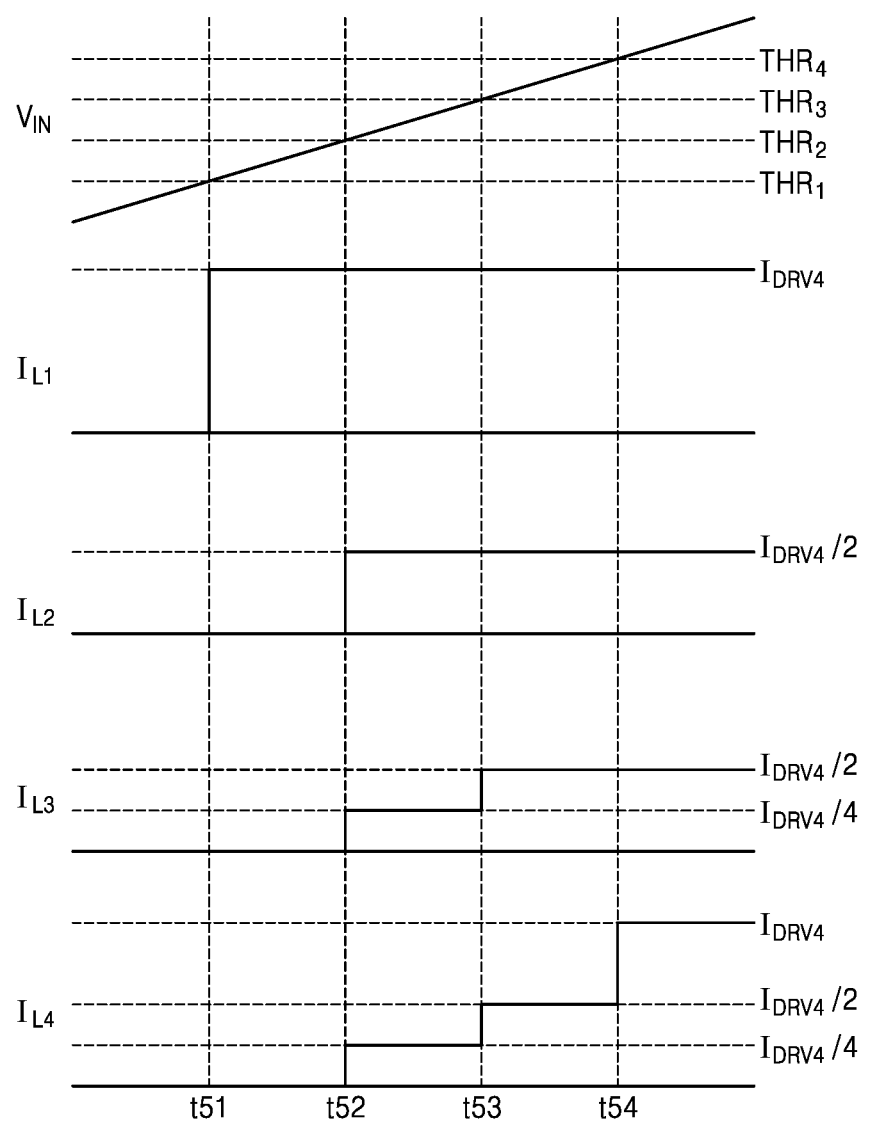
FIG. 9 is a timing diagram showing the operation of a lighting apparatus according to one or more embodiments.

FIG. 8 is a circuit diagram showing a lighting apparatus 80 according to one or more embodiments, and FIG. 9 is a timing diagram showing the operation of the lighting apparatus 80 according to one or more embodiments.

Referring to FIG. 8, the lighting apparatus 80 may include an LED driver 83, a current distributor 84, the fourth LED group G4, the first diode D1, and the second diode D2. The fourth LED group G4 may include the first to fourth LEDs L1 to L4.

The LED driver 83 may include an amplifier A8, first to fourth transistors M81 to M84, diodes D81 to D83, and a resistor R8. The amplifier A8 may include a non-inverting input to which a reference voltage $V_{REF}$ is applied and an inverting input connected to the resistor R8 and provide a bias voltage VBIAS to gates of the first to fourth transistors M81 to M84. Therefore, the fourth current source CS4 that drains the fourth LED driving current $I_{DRV4}$ having a magnitude corresponding to '$V_{REF}/R8$' from the fourth LED group G4 may be formed. Also, an increasing drain-source voltage may be applied to the first to fourth transistors M81 to M84 by the diodes D81 to D83, and thus the first to fourth transistors M81 to M84 may correspond to the first to fourth switches SW1 to SW4 of FIG. 4, respectively. As described above with reference to FIG. 4, the LED driver 83 may further include additional current sources. The LED driver 83 shown in FIG. 8 is merely an example, and, in some embodiments, the LED driver 83 may have a structure different from that shown in FIG. 8 (e.g., 63 of FIG. 6).

The current distributor 84 may include the first terminal T1, a first current source CS81, and a second current source CS82. The first current source CS81 and the second current source CS82 may be current controlled current sources. For example, as shown in FIG. 8, a first sensing voltage $V_{SEN1}$ may be generated by sensing the second LED current $I_{L2}$ passing through the second LED L2, and the first current source CS81 may supply the second current $I_2$ corresponding to the magnitude of the first sensing voltage $V_{SEN1}$. Also, a second sensing voltage $V_{SEN2}$ may be generated by sensing the third LED current $I_{L3}$ passing through the third LED L3, and the second current source CS82 may supply the third current $I_{L3}$ corresponding to the magnitude of the second sensing voltage $V_{SEN2}$.

Referring to FIG. 9, the input voltage $V_{IN}$ may gradually increase. At a time point t51, the input voltage $V_{IN}$ may cross the first threshold value $THR_1$. In some embodiments, the first threshold value $THR_1$ may correspond to the LED voltage of the first to third LED groups G1 to G3 and the LED voltage of the first LED L1 of the fourth LED group G4. The first to fourth transistors M81 to M84 may be turned on. However, since the input voltage $V_{IN}$ is between the first threshold value $THR_1$ and the second threshold value $THR_2$, second to fourth transistors M82 to M84 may not pass current therethrough. Accordingly, the first LED current $I_{L1}$ equal to the fourth LED driving current $I_{DRV4}$ may pass through the first LED L1.

At a time point t52, the input voltage $V_{IN}$ may cross a second threshold value $THR_2$. In some embodiments, the second threshold value $THR_2$ may correspond to the LED voltage of the first to third LED groups G1 to G3 and the LED voltage of the first LED L1 and the second LED L2 of the fourth LED group G4. A first transistor M81 may be turned off, and the second to fourth transistors M82 to M84 may be turned on. The first LED current $I_{L1}$ equal to the fourth LED driving current $I_{DRV4}$ may flow into the current distributor 84 through the first terminal T1, and the sum of the second to fourth LED currents $I_{L2}$ to $I_{L4}$ may be equal to the first LED current $I_{L1}$. The first current source CS81 may supply the second current $I_2$ having the same magnitude as the first current $I_1$, and the second current source CS82 may supply the third current $I_3$ having the same magnitude as the third LED current $I_{L3}$. Therefore, the second LED current $I_{L2}$ may correspond to ½ of the fourth LED driving current $I_{DRV4}$, respectively, the third LED current $I_{L3}$ and the fourth LED current $I_{L4}$ may each correspond to ¼ of the fourth LED driving current $I_{DRV4}$.

At a time point t53, the input voltage $V_{IN}$ may cross the third threshold value $THR_3$. In some embodiments, the third threshold value $THR_3$ may correspond to the LED voltage of the first to third LED groups G1 to G3 and the LED voltage of the first to third LEDs L1 to L3 of the fourth LED group G4. The first transistor M81 and a second transistor M82 may be turned off, and a third transistor M83 and a fourth transistor M84 may be turned on. The third LED current $I_{L3}$ may correspond to the sum of the second LED current $I_{L2}$ and the second current $I_2$ supplied by the first current source CS81, the magnitude of the fourth LED current $I_{L4}$ may correspond to the magnitude of the third LED current $I_{L3}$, and the sum of the third LED current $I_{L3}$ and the fourth LED current $I_{L4}$ may correspond to the fourth LED driving current $I_{DRV4}$. Therefore, the second LED current $I_{L2}$ may correspond to ½ of the fourth LED driving current $I_{DRV4}$, and the third LED current $I_{L3}$ and the fourth LED current $I_{L4}$ may each correspond to ½ of the fourth LED driving current $I_{DRV4}$.

At a time point t54, the input voltage $V_{IN}$ may cross the fourth threshold value $THR_4$. In some embodiments, the fourth threshold value $THR_4$ may correspond to the LED voltage of the first to third LED groups G1 to G3 and the LED voltage of the first to fourth LEDs L1 to L4 of the fourth LED group G4. First to third transistors M81 to M83 may be turned off, and the fourth transistor M84 may be turned on. The fourth LED current $I_{L4}$ may correspond to the fourth LED driving current $I_{DRV4}$, and the second LED current $I_{L2}$ and the third LED current $I_{L3}$ may each correspond to ½ of the fourth LED current $I_{L4}$. As a result, currents may flow in all of the first to fourth LEDs L1 to L4 after the time point t52, and thus the first to fourth LEDs L1 to L4 may emit light.

FIGS. 10A to 10E are circuit diagrams showing examples of a current distributor according to one or more embodiments. In detail, FIGS. 10A to 10E show examples of a circuit included in a current distributor, which senses a sensing current $I_{SEN}$ and generates an output current $I_{OUT}$ based on the sensing current $I_{SEN}$.

Figure 10A:
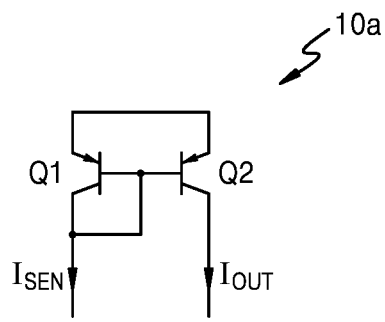
FIG. 10A is an example of a circuit diagram of a current distributor according to one or more embodiments.
Figure 10B:
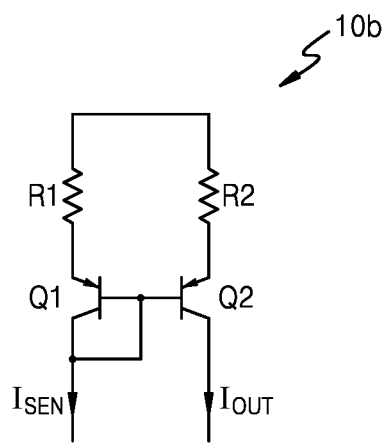
FIG. 10B is another example of a circuit diagram of a current distributor according to one or more embodiments.
Figure 10C:
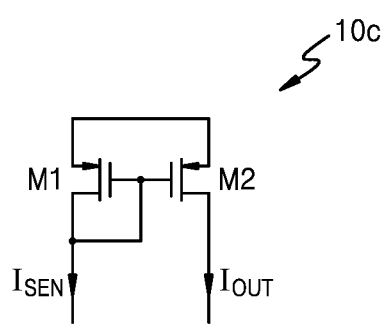
FIG. 10C is a yet another example of a circuit diagram of a current distributor according to one or more embodiments.
Figure 10D:
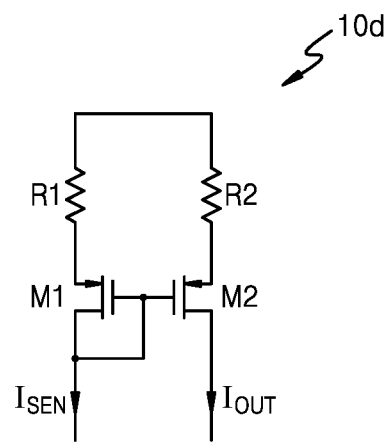
FIG. 10D is an example of a circuit diagram of a current distributor according to one or more embodiments.

Referring to FIGS. 10A to 10D, in some embodiments, a current distributor may include a current mirror. Referring to FIG. 10A, a circuit 10a may include a current mirror implemented with bipolar junction transistors. The output current $I_{OUT}$ passing through a second transistor Q2 may be proportional to the sensing current $I_{SEN}$ passing through a first transistor Q1. Referring to FIG. 10B, a circuit 10b may include a first resistor R1 and a second resistor R2 as well as a first transistor Q1 and a second transistor Q2. Due to the first resistor R1 and the second resistor R2, an effect due to a mismatch between the first transistor Q1 and the second transistor Q2 may be reduced, and a ratio between the sensing current $I_{SEN}$ and the output current $I_{OUT}$ may be adjusted. Referring to FIG. 10C, a circuit 10c may include a current mirror implemented with field effect transistors. The output current $I_{OUT}$ passing through a second transistor M2 may be proportional to the sensing current $I_{SEN}$ passing through a first transistor M1. Referring to FIG. 10D, a circuit 10d may include the first resistor R1 and the second resistor R2 as well as a first transistor M1 and a second transistor M2. Due to the first resistor R1 and the second resistor R2, an effect due to a mismatch between the first transistor M1 and the second transistor M2 may be reduced, and a ratio between the sensing current $I_{SEN}$ and the output current $I_{OUT}$ may be adjusted.

Figure 10E:
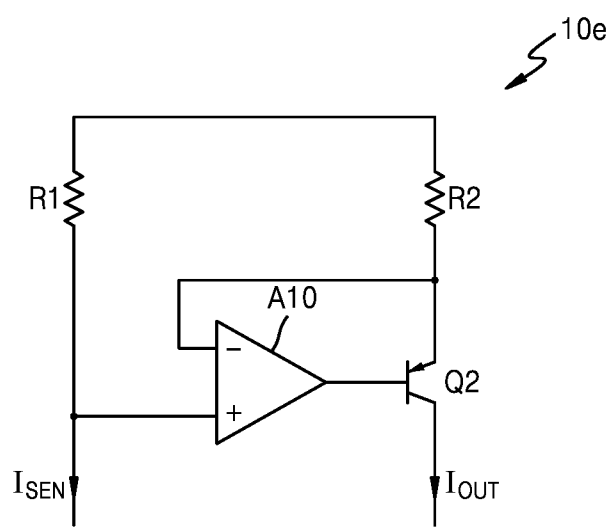
FIG. 10E is another example of a circuit diagram of a current distributor according to one or more embodiments.

Referring to FIG. 10E, in some embodiments, a current distributor may include an amplifier. Referring to FIG. 10E, a circuit 10e may include an amplifier A10, the first transistor Q1, the first resistor R1, and the second resistor R2. Therefore, a voltage depending on the sensing current $I_{SEN}$ may be formed at a non-inverting input and an inverting input of the amplifier A10, and the output current $I_{OUT}$ having a magnitude dependent on the sensing current $I_{SEN}$ may be generated. In some embodiments, as described later with reference to FIG. 13, the first transistor Q1 of the circuit 10e may be replaced with a field effect transistor (i.e., a PFET).

In some embodiments, a current distributor may include additional circuits in a manner similar to circuits shown in FIGS. 10A to 10E. For example, the current distributor 64 of FIG. 6 may be implemented by adding a third transistor having a base connected to bases of the first transistor Q1 and the second transistor Q2 and an emitter connected to emitters of the first transistor Q1 and the second transistor Q2 to the circuit 10a of FIG. 10A. Therefore, the first current $I_1$ may correspond to the sensing current $I_{SEN}$, and the second current $I_2$ and the third current $I_3$ may correspond to currents output by the second transistor Q2 and the added transistor, respectively. Also, the current distributor 64 of FIG. 6 may be implemented by adding a third transistor having an emitter and a base respectively connected to an emitter and a base of the first transistor Q1 to the circuit 10e of FIG. 10E. Therefore, the first current $I_1$ may correspond to the sensing current $I_{SEN}$, and the second current $I_2$ and the third current $I_3$ may correspond to currents output by the first transistor Q1 and the added transistor, respectively.

Figure 11:
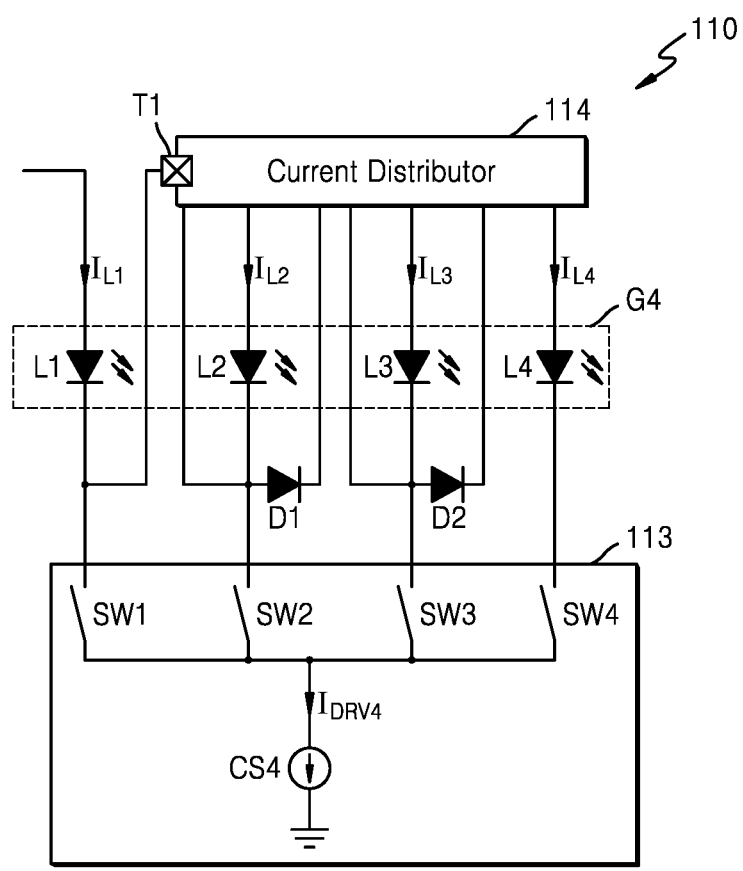
FIG. 11 is a block diagram showing a lighting apparatus according to one or more embodiments.
Figure 12:
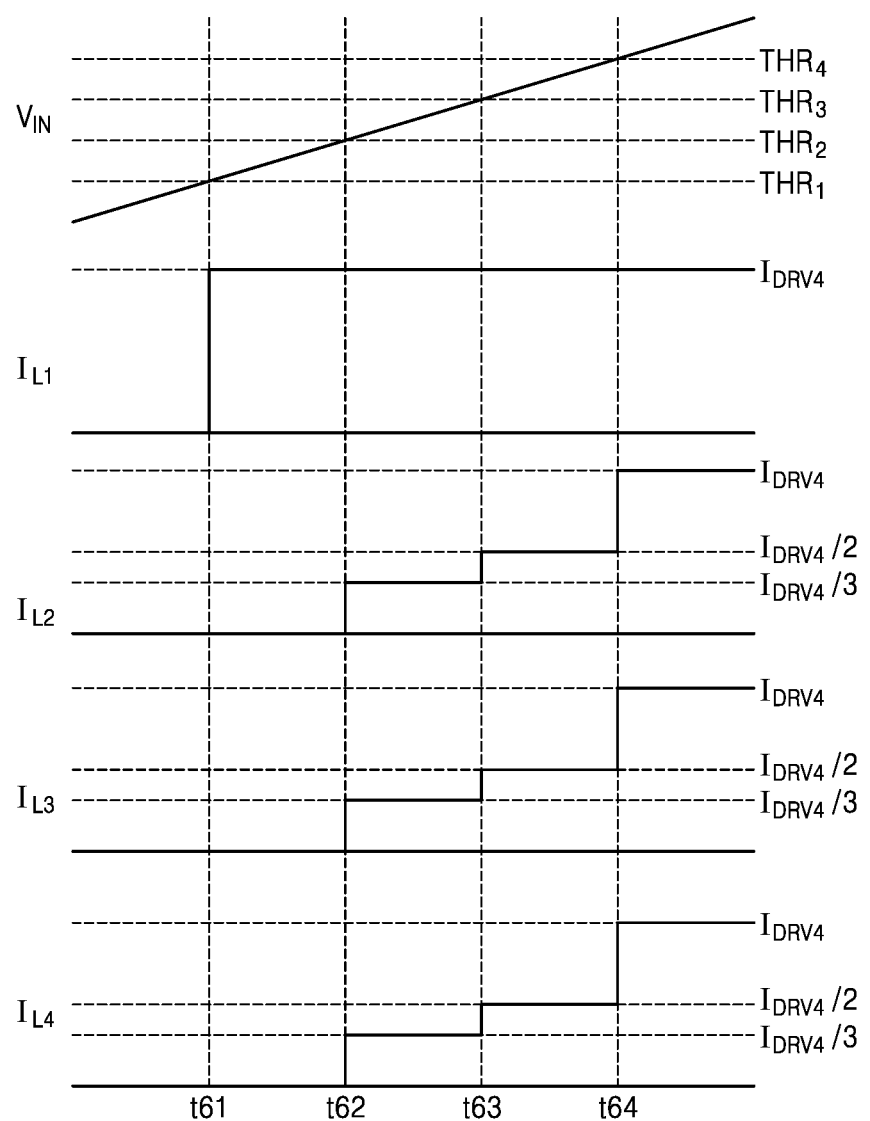
FIG. 12 is a timing diagram showing the operation of a lighting apparatus according to one or more embodiments.

FIG. 11 is a block diagram showing a lighting apparatus 110 according to one or more embodiments, and FIG. 12 is a timing diagram showing the operation of the lighting apparatus 110 according to one or more embodiments.

Referring to FIG. 11, the lighting apparatus 110 may include an LED driver 113, a current distributor 114, the fourth LED group G4, the first diode D1, and the second diode D2. The LED driver 113 may include the fourth current source CS4 and the first to fourth switches SW1 to SW4. Unlike the current distributor 44 of FIG. 4, the current distributor 114 of FIG. 11 may be connected to anodes of the first diode D1 and the second diode D2. When the input voltage $V_{IN}$ has a magnitude large enough to drive an LED, at least a portion of the current distributor 114 may be disabled, thereby reducing power consumption by the current distributor 114 and providing higher current to the LED. To this end, the current distributor 114 may sense a voltage across the first diode D1 and a voltage across the second diode D2 and, when the voltage at an anode is higher than a voltage at a cathode, at least a portion of the current distributor 114 may be disabled.

Referring to FIG. 12, the input voltage $V_{IN}$ may gradually increase. At a time point t61, the input voltage $V_{IN}$ may cross the first threshold value $THR_1$. In some embodiments, the first threshold value $THR_1$ may correspond to the LED voltage of the first to third LED groups G1 to G3 and the LED voltage of the first LED L1 of the fourth LED group G4. The first to fourth switches SW1 to SW4 may be turned on. However, since the input voltage $V_{IN}$ is between the first threshold value $THR_1$ and the second threshold value $THR_2$, the second to fourth switches SW2 to SW4 may not pass current therethrough. Accordingly, the first LED current $I_{L1}$ equal to the fourth LED driving current $I_{DRV4}$ may pass through the first LED L1.

At a time point t62, the input voltage $V_{IN}$ may cross a second threshold value $THR_2$. In some embodiments, the second threshold value $THR_2$ may correspond to the LED voltage of the first to third LED groups G1 to G3 and the LED voltage of the first LED L1 and the second LED L2 of the fourth LED group G4. The first switch SW1 may be turned off, and the second to fourth switches SW2 to SW4 may be turned on. The first LED current $I_{L1}$ equal to the fourth LED driving current $I_{DRV4}$ may flow into the current distributor 114 through the first terminal T1, and the sum of the second to fourth LED currents $I_{L2}$ to $I_{L4}$ may be equal to the first LED current $I_{L1}$. Therefore, the second to fourth LED currents $I_{L2}$ to $I_{L4}$ may each correspond to ⅓ of the fourth LED driving current $I_{DRV4}$.

At a time point t63, the input voltage $V_{IN}$ may cross the third threshold value $THR_3$. In some embodiments, the third threshold value $THR_3$ may correspond to the LED voltage of the first to third LED groups G1 to G3 and the LED voltage of the first to third LEDs L1 to L3 of the fourth LED group G4. The first switch SW1 and the second switch SW2 may be turned off, and a third switch SW3 and the fourth switch SW4 may be turned on. The second LED current $I_{L2}$ may pass through the first diode D1 and constitute a part of the third LED current $I_{L3}$, and an anode voltage of the first diode D1 may be higher than a cathode voltage of the first diode D1. Therefore, the current distributor 114 may disable a component that supplies a current based on the second LED current $I_{L2}$ (e.g., CS61 of FIG. 6 or CS81 of FIG. 8), and thus the second LED current $I_{L2}$ the third LED current $I_{L3}$ may be equal to each other. As a result, as shown in FIG. 12, the second to fourth LED currents $I_{L2}$ to $I_{L4}$ may correspond to ½ of the fourth LED driving current $I_{DRV4}$.

At a time point t64, the input voltage $V_{IN}$ may cross the fourth threshold value $THR_4$. In some embodiments, the fourth threshold value $THR_4$ may correspond to the LED voltage of the first to third LED groups G1 to G3 and the LED voltage of the first to fourth LEDs L1 to L4 of the fourth LED group G4. First to third switches SW1 to SW3 may be turned off, and the fourth switch SW4 may be turned on. The third LED current $I_{L3}$ may pass through the second diode D2 and constitute a part of the fourth LED current $I_{L4}$, and an anode voltage of the second diode D2 may be higher than a cathode voltage of the second diode D2. Therefore, the current distributor 114 may disable a component that supplies a current based on the third LED current $I_{L3}$ (e.g., CS62 of FIG. 6 or CS82 of FIG. 8), and thus the second to fourth LED currents $I_{L2}$ to $I_{L4}$ may be equal to one another. As a result, as shown in FIG. 12, the second to fourth LED currents $I_{L2}$ to $I_{L4}$ may correspond to the fourth LED driving current $I_{DRV4}$. Compared with the examples of FIGS. 7 and 9, in the example of FIG. 12, after a time point t62, currents having larger magnitudes may pass through the second to fourth LEDs L2 to L4, and thus light of stronger intensity may be emitted.

Figure 13:
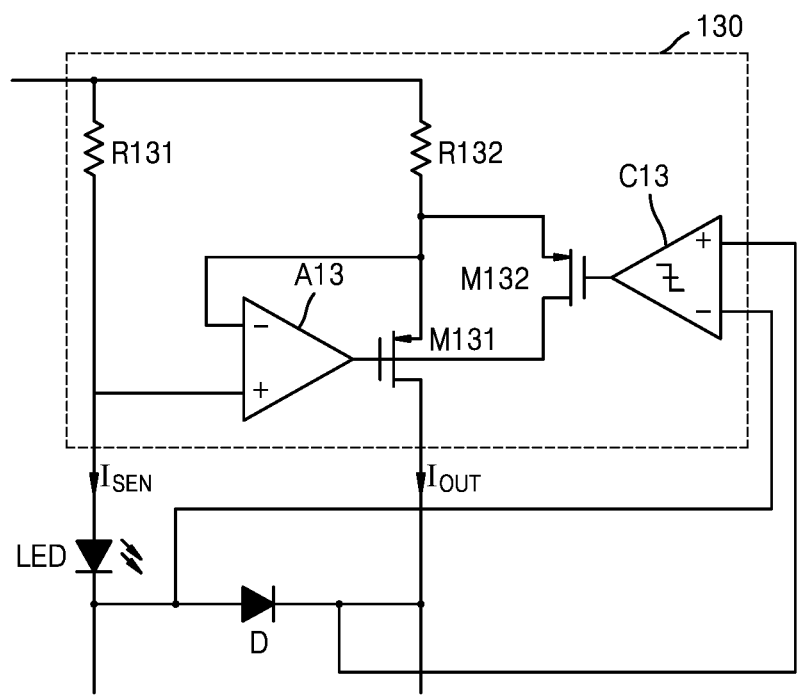
FIG. 13 is a circuit diagram showing a current distributor according to one or more embodiments.

FIG. 13 is a circuit diagram showing a current distributor 130 according to one or more embodiments. In detail, the circuit diagram of FIG. 13 shows the current distributor 130 for disabling a portion of the current distributor by sensing a voltage across a diode, as described above with reference to FIGS. 11 and 12.

Referring to FIG. 13, the current distributor 130 includes first to fifth terminals T131 to T135, an amplifier A13, a comparator C13, a first transistor M131, a second transistor M132, a first resistor R131, and a second resistor R132. In some embodiments, the first resistor R131 and/or the second resistor R132 may be provided outside the current distributor 130.

The comparator C13 may receive a voltage across a diode D. When an anode voltage of the diode D is lower than a cathode voltage thereof, the comparator C13 may generate a high-level output signal. In response to the high-level output signal, the second transistor M132 may be turned off, and the amplifier A13, the first transistor M131, the first resistor R131, and the second resistor R132 may, as described above with reference to FIG. 10E, generate an output current $I_{OUT}$ that is dependent on the sensing current $I_{SEN}$. Conversely, when the anode voltage of the diode D is higher than the cathode voltage thereof, the comparator C13 may generate a low-level output signal. In response to the low-level output signal, the second transistor M132 may be turned on and electrically connect a source and a gate of the first transistor M131. Therefore, the first transistor M131 may be turned off, and the supply of a first output voltage $I_{OUT}$ may be cut off. It will be understood that the structure of FIG. 13 may be repeated when a current distributor distributes a plurality of currents, as described above with reference to FIGS. 10A to 10E.

Figure 14A:
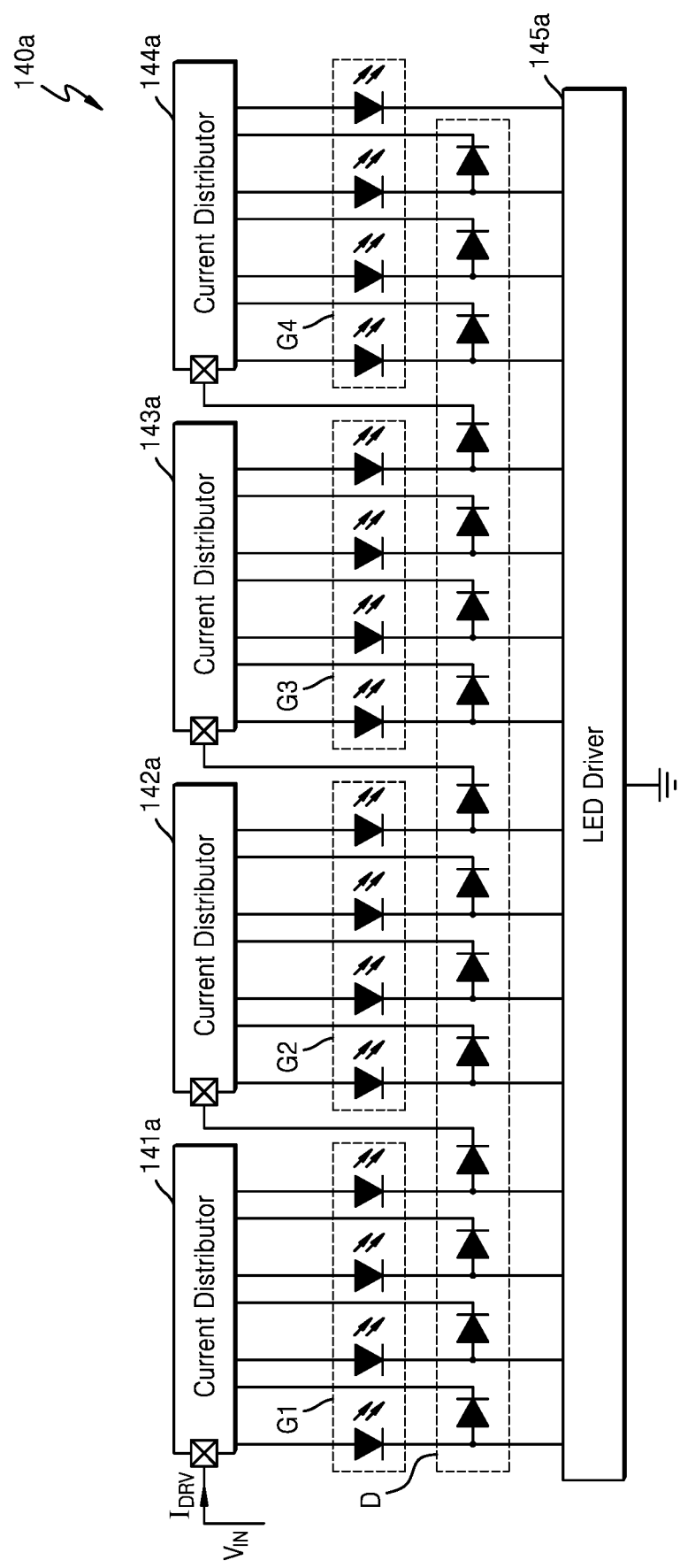
FIGS. 14A and 14B are block diagrams showing examples of a lighting apparatus according to one or more embodiments.
Figure 14B:
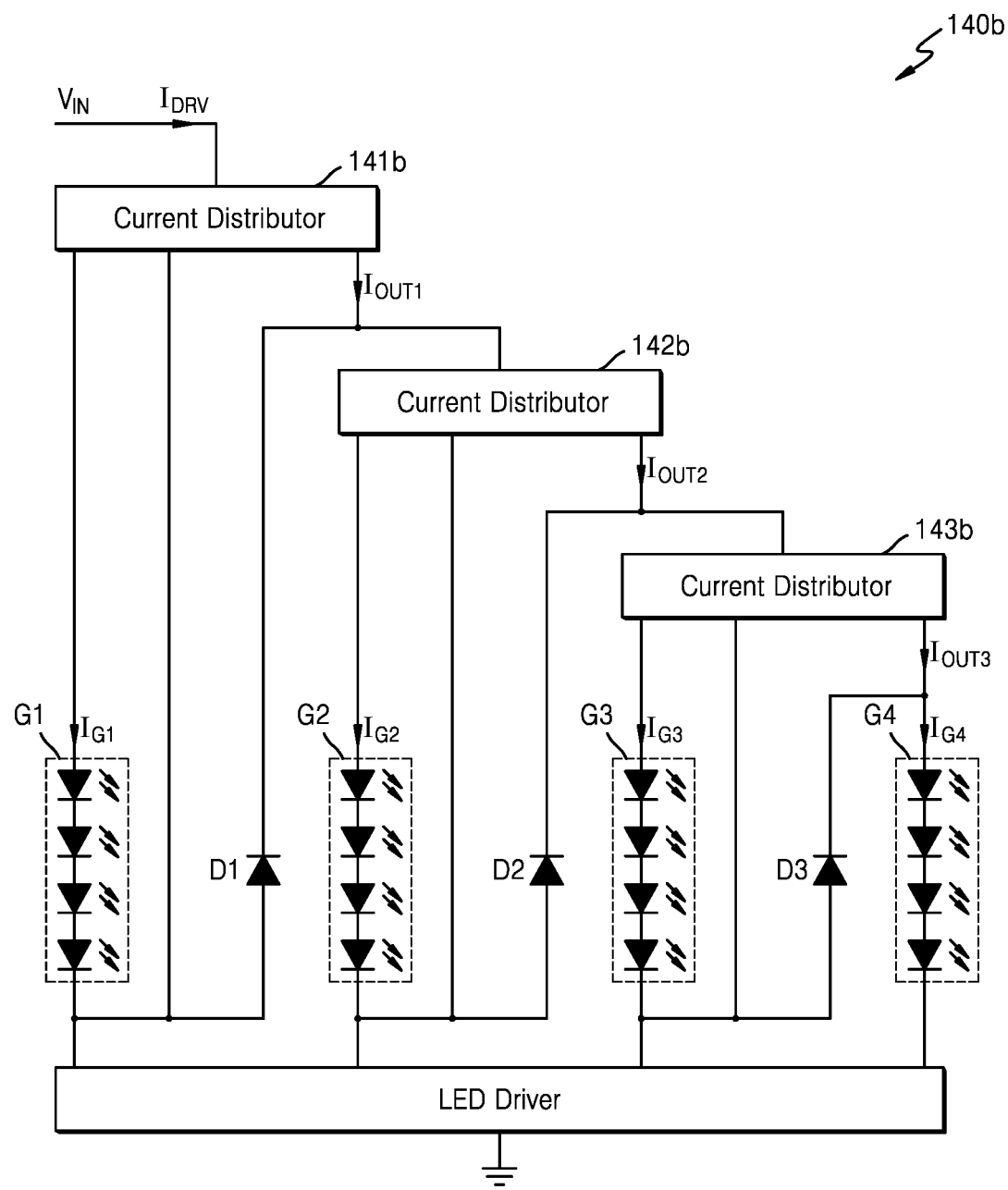

FIGS. 14A and 14B are block diagrams showing examples of a lighting apparatus according to one or more embodiments. In some embodiments, a lighting apparatus 140a may include a plurality of current distributors, and the plurality of current distributors may be variously combined.

Referring to FIG. 14A, the lighting apparatus 140a may include first to fourth current distributors 141a to 144a, the first to fourth LED groups G1 to G4, diodes D, and an LED driver 145a. The first to fourth current distributors 141a to 144a may be respectively included in four semiconductor packages or two or more current distributors from among the first to fourth current distributors 141a to 144a may be included in one semiconductor package. In some embodiments, the first to fourth current distributors 141a to 144a may have the same structure.

As shown in FIG. 14A, the first to fourth current distributors 141a to 144a may correspond to the first to fourth LED groups G1 to G4, respectively. As described above with reference to the drawings, the first to fourth current distributors 141a to 144a may each distribute a current to each of LEDs included in a corresponding LED group. Therefore, a time period during which LEDs of the first to fourth LED groups G1 to G4 emit light may be extended. Furthermore, despite the fluctuation of the peak of the input voltage $V_{IN}$, all of LEDs in the first to fourth LED groups G1 to G4 may emit light. In some embodiments, as described above with reference to FIG. 11, the first to fourth current distributors 141a to 144a may be connected to the anodes of the diodes D, respectively, and may disable at least some components based on voltages across the diodes D.

Referring to FIG. 14B, a lighting apparatus 140b may include first to third current distributors 141b to 143b, the first to fourth LED groups G1 to G4, first to third diodes D1 to D3, and an LED driver 145b. The first to third current distributors 141b to 143b may be included in three semiconductor packages, respectively, or two or more current distributors from among the first to third current distributors 141b to 143b may be included in one semiconductor package. In some embodiments, the first to third current distributors 141b to 143b may have the same structure.

As shown in FIG. 14B, the first to third current distributors 141b to 143b may be connected in a cascaded shape. For example, a first current distributor 141b may receive the LED driving current $I_{DRV}$, and supply a first LED group current $I_{G1}$ to the first LED group G1, and may sense the first LED group current $I_{G1}$ and supply a first output current $I_{OUT1}$ to a second current distributor 142b. The second current distributor 142b may receive the first output current $I_{OUT1}$ and a current passed through the first diode D1, and supply a second LED group current $I_{G2}$ to the second LED group G2, and may sense the second LED group current $I_{G2}$ and supply a second output current $I_{OUT2}$ to a third current distributor 143b. The third current distributor 143b may receive the second output current $I_{OUT2}$ and a current passed through the second diode D2, and supply a third LED group current $I_{G3}$ to the third LED group G3, and may sense the third LED group current $I_{G3}$ and supply a third output current $I_{OUT3}$ to the fourth LED group G4. The fourth LED group G4 may receive the third output current $I_{OUT3}$ and a current passed through a third diode D3. Therefore, a time period during which LEDs of the first to fourth LED groups G1 to G4 emit light may be extended. Furthermore, despite the fluctuation of the peak of the input voltage $V_{IN}$, all of LEDs in the first to fourth LED groups G1 to G4 may emit light.

As described above with reference to FIG. 11, the first current distributor 141b may sense a voltage across the first diode D1 and may disable some components based on a sensed voltage. Also, the second current distributor 142b may sense a voltage across the second diode D2 and may disable some components based on a sensed voltage. Also, the third current distributor 143b may sense a voltage across the third diode D3 and may disable some components based on a sensed voltage.

Figure 15:
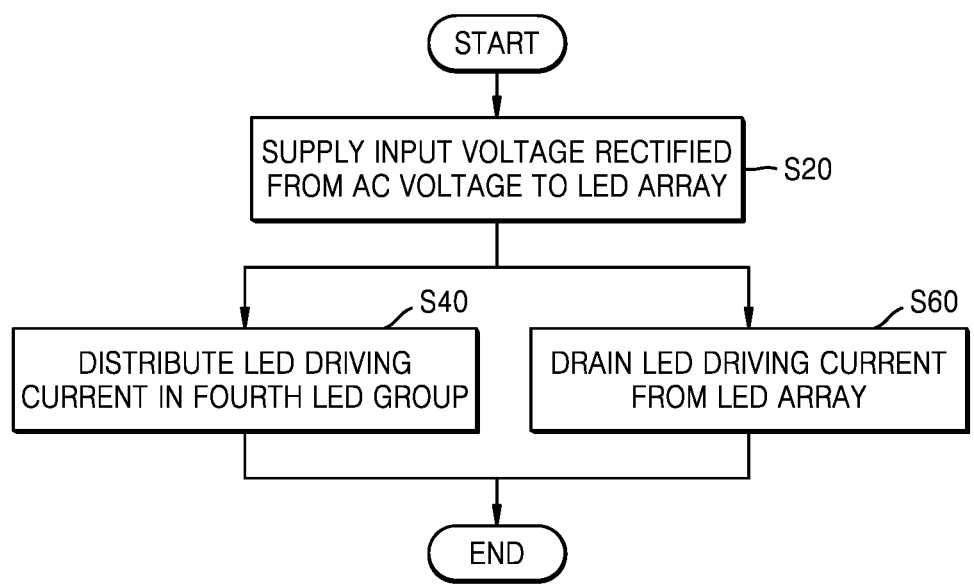
FIG. 15 is a flowchart of a method of driving an LED according to one or more embodiments.

FIG. 15 is a flowchart of a method of driving an LED according to one or more embodiments. As shown in FIG. 15, the method of driving an LED may include a plurality of operations S20, S40, and S60, and operations S40 and S60 may be performed in parallel with each other. In some embodiments, the method of FIG. 15 may be performed by the LED driver 43 and current distributor 44 of FIG. 4, which will be described below with reference to FIGS. 15 and 4.

Referring to FIG. 15, in operation S20, the input voltage $V_{IN}$ rectified from the AC voltage $V_{AC}$ may be supplied to the LED array 42. For example, the rectifier 11 of FIG. 1 may full-wave rectify the AC voltage $V_{AC}$, and a full-wave rectified input voltage $V_{IN}$ may be supplied to the LED array 42.

In operation S40, the LED driving current $I_{DRV}$ may be distributed in the fourth LED group G4. As shown in FIG. 4, from among LED groups included in the LED array 42, the fourth LED group G4 may be farthest apart from a node to which the input voltage $V_{IN}$ is applied. Even when the peak of the input voltage $V_{IN}$ fluctuates, the current distributor 44 may distribute a current to the first to fourth LEDs L1 to L4, such that the first to fourth LEDs L1 to L4 included in the fourth LED group G4 emit light. Examples of operation S40 will be described later with reference to FIGS. 16A and 16B.

In operation S60, the LED driving current $I_{DRV}$ may be drained from the LED array 42. For example, the LED driver 43 may include the first to fourth current sources CS1 to CS4 respectively corresponding to the first to fourth LED groups G1 to G4 included in the LED array 42, and the first to fourth current sources CS1 to CS4 may drain the first to fourth LED driving currents $I_{DRV1}$ to $I_{DRV4}$ from the LED array 42 in different periods, respectively. The fourth current source CS4 may drain the fourth LED driving current $I_{DRV4}$ from the fourth LED group G4, and thus, in operation S40, the current distributor 44 may distribute the fourth LED driving current $I_{DRV4}$ to the first to fourth LEDs L1 to L4 included in the fourth LED group G4. An example of operation S60 will be described later with reference to FIG. 17.

Figure 16A:
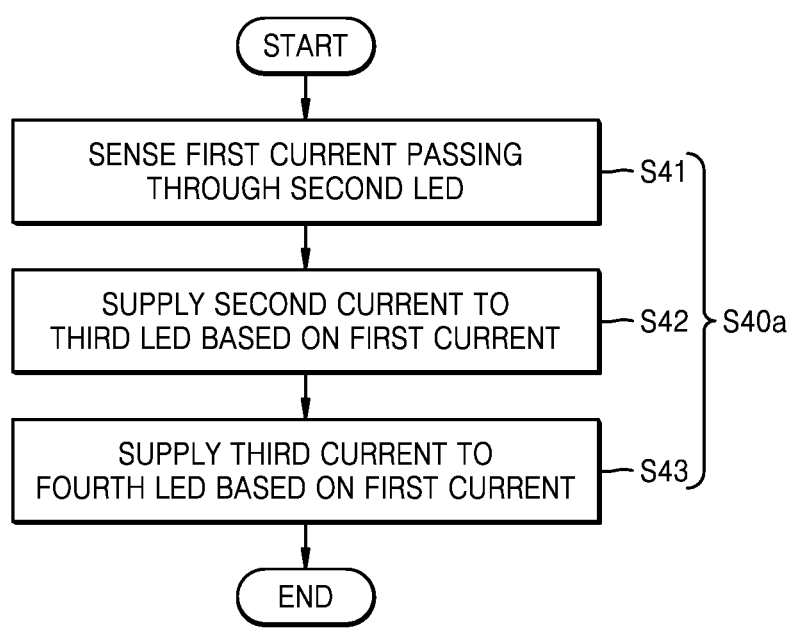
FIGS. 16A and 16B are flowcharts showing examples of a method of driving an LED according to one or more embodiments.
Figure 16B:
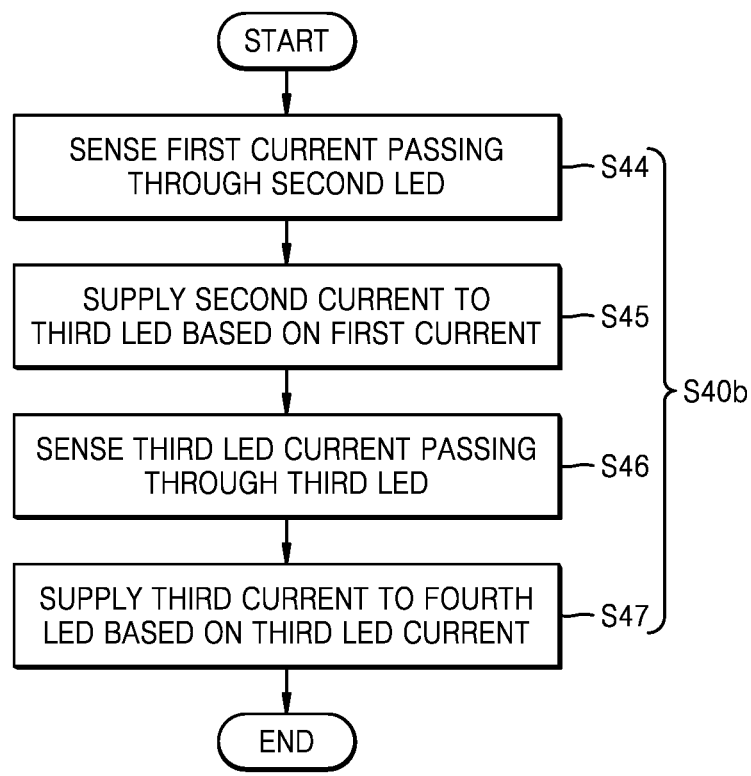

FIGS. 16A and 16B are flowcharts showing examples of a method of driving an LED according to one or more embodiments. In detail, the flowcharts of FIGS. 16A and 16B show examples of operation S40 of FIG. 15, respectively. As described above with reference to FIG. 15, in operation S40a of FIG. 16A and operation S40b of FIG. 16B, a LED driving current may be distributed in a fourth LED group. In some embodiments, operation S40a of FIG. 16A may be performed by the current distributor 64 of FIG. 6, and operation S40b of FIG. 16B may be performed by the current distributor 84 of FIG. 8. Hereinafter, FIGS. 16A and 16B will be described with reference to FIGS. 6 and 8.

Referring to FIG. 16A, operation S40a may include a plurality of operations S41 to S43. In operation S41, the first current $I_1$ passing through the second LED L2 may be sensed. For example, the current distributor 64 of FIG. 6 may generate the sensing voltage $V_{SEN}$ by sensing the first current $I_1$.

In operation S42, the second current $I_2$ may be supplied to the third LED L3 based on the first LED current $I_{L1}$. For example, the current distributor 64 may include the first current source CS61, and the first current source CS61 may supply the second current $I_2$ depending on the sensing voltage $V_{SEN}$ generated in operation S41 to the third LED L3.

In operation S43, the third current $I_3$ may be supplied to the fourth LED L4 based on the first current $I_1$. For example, the current distributor 64 may include the second current source CS62, and the second current source CS62 may supply the third current $I_3$ depending on the sensing voltage $V_{SEN}$ generated in operation S41 to the fourth LED L4.

Referring to FIG. 16B, operation S40b may include a plurality of operations S44 to S47. In operation S44, the first current $I_1$ passing through the second LED L2 may be sensed. For example, the current distributor 84 of FIG. 8 may generate the first sensing voltage $V_{SEN1}$ by sensing the first current $I_1$.

In operation S45, the second current $I_2$ may be supplied to the third LED L3 based on the first current $I_1$. For example, the current distributor 84 may include the first current source CS81, and the first current source CS81 may supply the second current $I_2$ depending on the first sensing voltage $V_{SEN1}$ generated in operation S44 to the third LED L3.

In operation S46, the third LED current $I_{L3}$ passing through the third LED L3 may be sensed. For example, the current distributor 84 of FIG. 8 may generate the second sensing voltage $V_{SEN2}$ by sensing the third LED current $I_{L3}$.

In operation S47, the third current $I_3$ may be supplied to the fourth LED L4 based on the third LED current $I_{L3}$. For example, the current distributor 84 may include the second current source CS82, and the second current source CS82 may supply the third current $I_3$ depending on the second sensing voltage $V_{SEN2}$ generated in operation S46 to the fourth LED L4.

Figure 17:
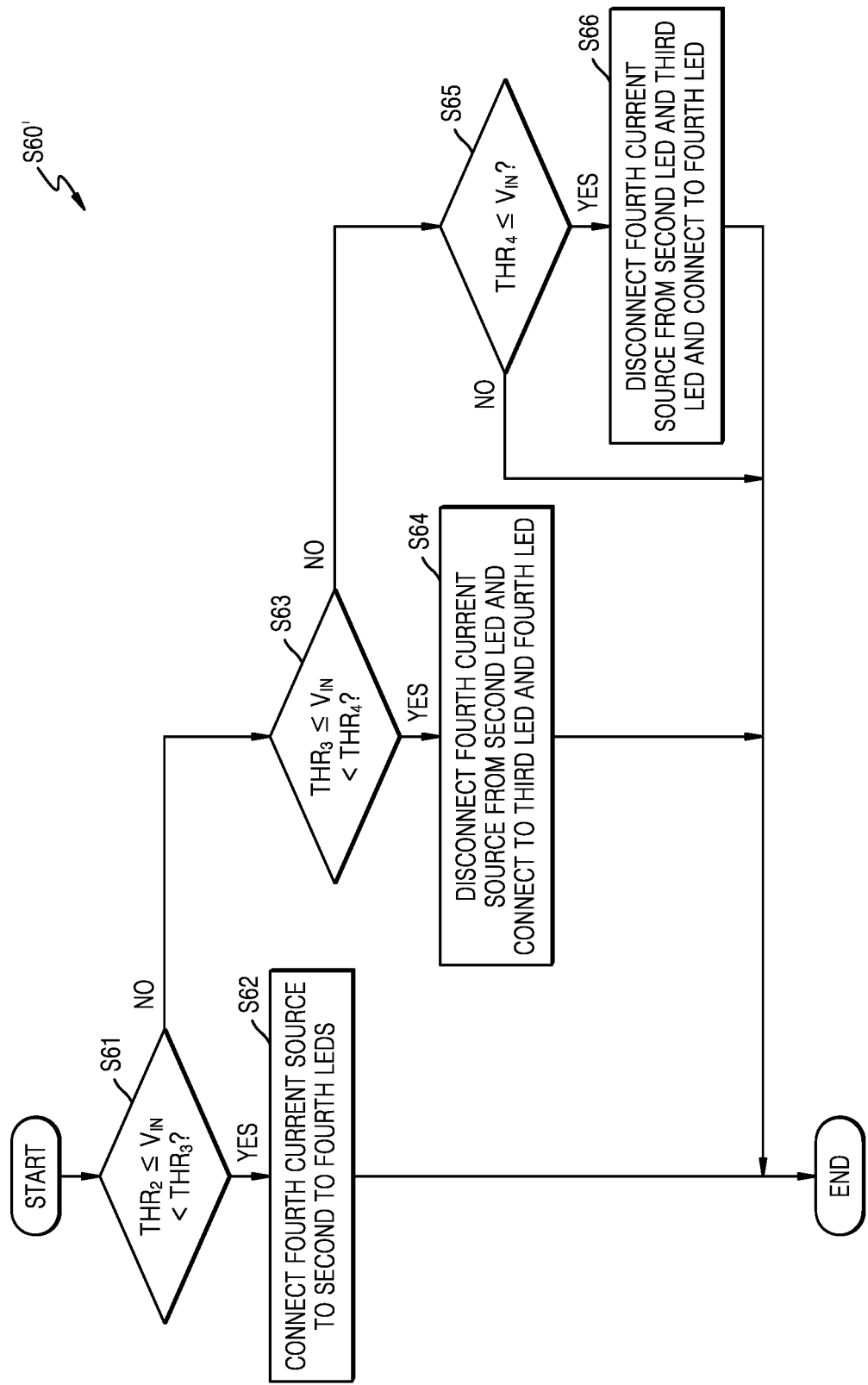
FIG. 17 is a flowchart of a method of driving an LED according to one or more embodiments.

FIG. 17 is a flowchart of a method of driving an LED according to one or more embodiments. In detail, FIG. 17 shows an example of operation S60 of FIG. 15. As described above with reference to FIG. 15, in operation S60' of FIG. 17, an LED driving current may be drained from an LED array. As shown in FIG. 17, operation S60' may include a plurality of operations S61 to S66. In some embodiments, operation S60' may be performed by the LED driver 43 of FIG. 4, and FIG. 17 will be described below with reference to FIG. 4.

Referring to FIG. 17, in operation S61, it may be determined whether the input voltage $V_{IN}$ is equal to or greater than the second threshold value $THR_2$ and less than the third threshold value $THR_3$. As shown in FIG. 17, when the input voltage $V_{IN}$ is equal to or greater than the second threshold value $THR_2$ and less than the third threshold value $THR_3$, in operation S62, the fourth current source CS4 may be connected to the second to fourth LEDs L2 to L4. For example, the first switch SW1 may be turned off, and the second to fourth switches SW2 to SW4 may be turned on.

When the input voltage $V_{IN}$ is less than the second threshold value $THR_2$ and equal to greater than the third threshold value $THR_3$, in operation S63, it may be determined whether the input voltage $V_{IN}$ is equal to or greater than the third threshold value $THR_3$ and less than the fourth threshold value $THR_4$. As shown in FIG. 17, when the input voltage $V_{IN}$ is equal to or greater than the third threshold value $THR_3$ and less than the fourth threshold value $THR_4$, in operation S64, the fourth current source CS4 may be disconnected from the second LED L2 and connected to the third LED L3 and the fourth LED L4. For example, the first switch SW1 and the second switch SW2 may be turned off, and a third switch SW3 and the fourth switch SW4 may be turned on.

When the input voltage $V_{IN}$ is less than the third threshold value $THR_3$ and equal to or greater than the fourth threshold value $THR_4$, in operation S65, it may be determined whether the input voltage $V_{IN}$ is equal to or greater than the fourth threshold value $THR_4$. As shown in FIG. 17, when the input voltage $V_{IN}$ is equal to or greater than the fourth threshold value $THR_4$, in operation S66, the fourth current source CS4 may be disconnected from the second LED L2 and the third LED L3 and may be connected to the fourth LED L4.

As described above, example embodiments have been disclosed in the drawings and specification. Although embodiments have been described herein using specific terminology, it is understood that they have been used only for purposes of describing the inventive concept and not for limiting the scope of the inventive concept as defined in the claims. Therefore, one of ordinary skill in the art will appreciate that various modifications and equivalent embodiments are possible without departing from the scope of the inventive concept. Accordingly, the true scope of protection of the present disclosure should be determined by the technical idea of the appended claims.

According to a device and a lighting apparatus according to one or more embodiments, all LEDs included in the lighting apparatus may be driven even when the peak of an AC voltage fluctuates, and thus high LED utilization may be achieved.

Also, according to a device and a lighting apparatus according to one or more embodiments, high light efficiency may be achieved in the lighting apparatus due to the high LED utilization.

Effects that may be obtained in one or more embodiments are not limited to the above-stated effects, and other effects not stated may be clearly derived and understood from the following description by one of ordinary skill in the art to which one or more embodiments pertain. In other words, unintended effects associated with the reduction of one or more embodiments into practice may also be derived from one or more embodiments by one of ordinary skill in the art.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A device comprising:
a light-emitting diode (LED) array comprising a plurality of LEDs;
a rectifier configured to supply an input voltage rectified from an AC voltage to the LED array;
an LED driver configured to drain an LED driving current from the LED array; and
a current distributor configured to sense a first current passing through at least one first LED from among the plurality of LEDs and supply a second current to at least one second LED from among the plurality of LEDs based on the first current,
wherein the first current and the second current are included in the LED driving current.

2. The device of claim 1, wherein the LED driver comprises:
a current source configured to drain the LED driving current from a first LED group comprising the at least one first LED and the at least one second LED;
a first switch connected between the at least one first LED and the current source; and
a second switch connected between the at least one second LED and the current source.

3. The device of claim 2, wherein, when the input voltage is equal to or greater than a first threshold value and less than a second threshold value, the first switch and the second switch are turned on, and
when the input voltage is equal to or greater than the second threshold value and less than a third threshold value, the first switch is turned off and the second switch is turned on.

4. The device of claim 2, further comprising a first diode comprising an anode connected to a first node to which the at least one first LED and the first switch are connected and a cathode connected to a second node to which the second current is output from the current distributor.

5. The device of claim 4, wherein the current distributor is configured to cut off supply of the second current when a voltage of the anode of the first diode is higher than a voltage of the cathode of the first diode.

6. The device of claim 2, wherein the current distributor is configured to supply a third current to at least one third LED from among the plurality of LEDs based on the first current,
the LED driver further comprises a third switch connected between the at least one third LED and the current source, and
the device further comprises a second diode comprising an anode connected to a third node to which the at least one second LED and the second switch are connected and a cathode connected to a fourth node to which the third current is output from the current distributor.

7. The device of claim 2, wherein the current distributor is configured to sense a current passing through the at least one second LED and supply a third current to at least one third LED from among the plurality of LEDs based on the current passing through the at least one second LED,
the LED driver further comprises a third switch connected between the at least one third LED and the current source, and
the device further comprises a second diode comprising an anode connected to a third node to which the at least one second LED and the second switch are connected and a cathode connected to a fourth node to which the third current is output from the current distributor.

8. The device of claim 2, wherein:
the LED array comprises a plurality of LED groups each comprising at least one LED, and
from among the plurality of LED groups, the first LED group is the farthest apart from a node to which the input voltage is applied.

9. The device of claim 1, wherein the current distributor comprises a current mirror configured to generate the second current proportional to the first current.

10. A method comprising:
supplying an input voltage rectified from an AC voltage to a light-emitting diode (LED) array including a plurality of LEDs;
draining an LED driving current from the LED array; and
distributing the LED driving current in a first LED group comprising at least one first LED and at least one second LED from among the plurality of LEDs,
wherein the distributing of the LED driving current comprises:
sensing a first current passing through the at least one first LED; and
supplying a second current to the at least one second LED based on the first current, and
wherein the first current and the second current are included in the LED driving current.

11. The method of claim 10, wherein the draining of the LED driving current comprises:
connecting a current source to the at least one first LED and the at least one second LED when the input voltage is equal to or greater than a first threshold value and less than a second threshold value; and
disconnecting the current source from the at least one first LED and connecting the current source to the at least one second LED when the input voltage is equal to or greater than the second threshold value and less than a third threshold value.

12. The method of claim 10, wherein the first LED group further comprises at least one third LED, and
the distributing of the LED driving current further comprises supplying a third current to the at least one third LED based on the first current.

13. The method of claim 10, wherein the first LED group further comprises at least one third LED, and
the distributing of the LED driving current further comprises:
sensing a current passing through the at least one second LED; and
supplying a third current to the at least one third LED based on the current passing through the at least one second LED.

* * * * *